(12) United States Patent
Yoder

(10) Patent No.: US 6,282,877 B1
(45) Date of Patent: Sep. 4, 2001

(54) FRUIT AND VEGETABLE HARVESTING APPARATUS AND METHODS

(75) Inventor: Joseph Yoder, Lewisburg, PA (US)

(73) Assignee: Pik Rite, Inc., Lewisburg, PA (US)

( * ) Notice: Subject to any disclaimer, the term of this patent is extended or adjusted under 35 U.S.C. 154(b) by 0 days.

(21) Appl. No.: 08/672,635

(22) Filed: Jun. 28, 1996

Related U.S. Application Data

(60) Provisional application No. 60/000,709, filed on Jun. 29, 1995.

(51) Int. Cl.$^7$ ............................................... A01D 45/00
(52) U.S. Cl. ........................................... 56/327.1; 460/145
(58) Field of Search ................... 56/327.1, 328.1; 460/130, 133, 144, 145, 147, 148, 91, 96

(56) References Cited

U.S. PATENT DOCUMENTS

| | | |
|---|---|---|
| 3,252,464 | 5/1966 | Hill et al. . |
| 3,344,591 | 10/1967 | Christie et al. . |
| 3,455,453 | 7/1969 | Hill . |
| 3,618,617 | 11/1971 | Gates et al. . |
| 3,666,017 | 5/1972 | Gates et al. . |
| 3,760,574 | 9/1973 | Tassone . |
| 3,959,959 | 6/1976 | Louault et al. . |
| 3,986,561 | 10/1976 | Bettencourt et al. . |
| 4,033,099 | 7/1977 | Friedel, Jr. et al. . |
| 4,111,210 | 9/1978 | Freeman et al. . |
| 4,147,017 | 4/1979 | Cortopassi et al. . |
| 4,157,005 | 6/1979 | Orlando et al. . |
| 4,232,506 | 11/1980 | Studer . |
| 4,234,045 | 11/1980 | Porter . |
| 4,261,163 | 4/1981 | Shaw . |
| 4,335,570 | 6/1982 | Fitzmaurice . |
| 4,365,463 | 12/1982 | Bettencourt et al. . |
| 4,570,426 | 2/1986 | Bettencourt et al. . |
| 4,915,671 | 4/1990 | Johnson . |
| 5,077,963 | 1/1992 | Harrison et al. . |
| 5,099,636 | 3/1992 | Yoder . |
| 5,197,269 | 3/1993 | Meester . |
| 5,480,353 | * 1/1996 | Garza, Jr. ..................... 460/133 X |
| 5,573,459 | * 11/1996 | Meester ............................ 460/145 |
| 5,702,301 | * 12/1997 | Meester ....................... 460/145 X |

FOREIGN PATENT DOCUMENTS

| | | |
|---|---|---|
| 2560736 | 3/1985 | (FR) . |
| WO9401996 | 2/1994 | (WO) . |

* cited by examiner

*Primary Examiner*—Robert E. Pezzuto
(74) *Attorney, Agent, or Firm*—Charles N. Quinn

(57) ABSTRACT

Method and apparatus for harvesting vinous crops includes cutting a fruit-carrying vine mass from its growing roots, sweeping the vine mass with rotary reel motion onto a upwardly inclined endless conveyor for carriage to a position of commencement of a first arcuate path and thereafter carrying the vine mass along the arcuate path by first lifting and then lowering the vine mass while imparting vibratory motion to the vine mass to separate fruit from vines of the mass.

23 Claims, 16 Drawing Sheets

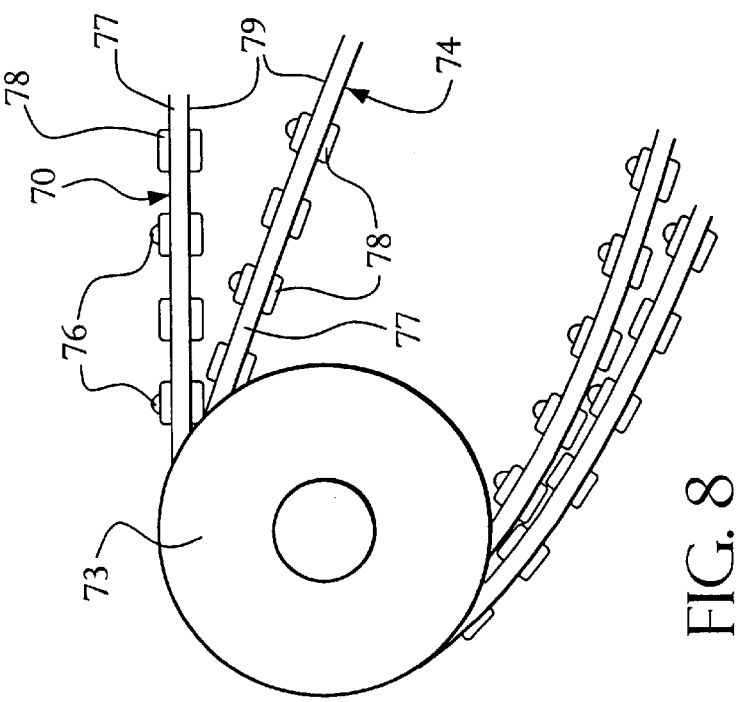
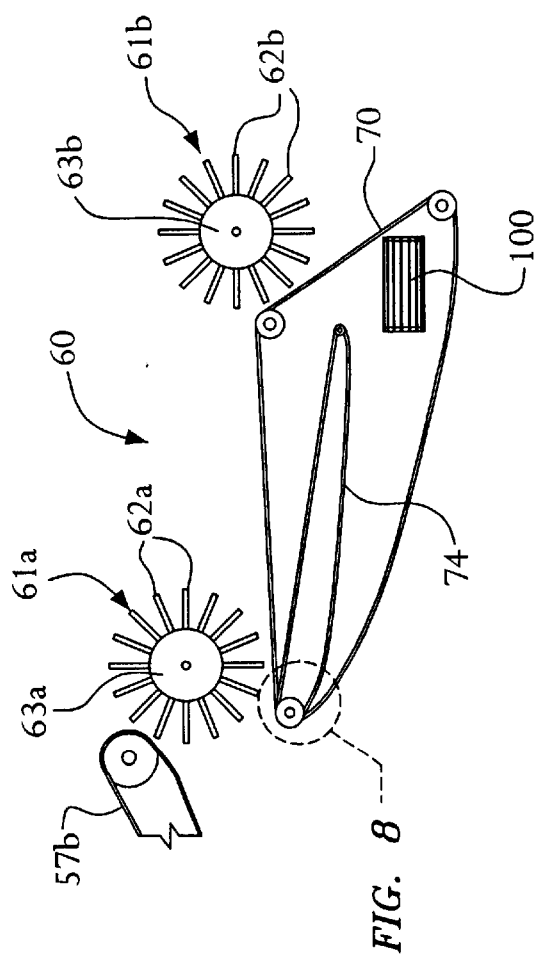
FIG. 8
FIG. 7

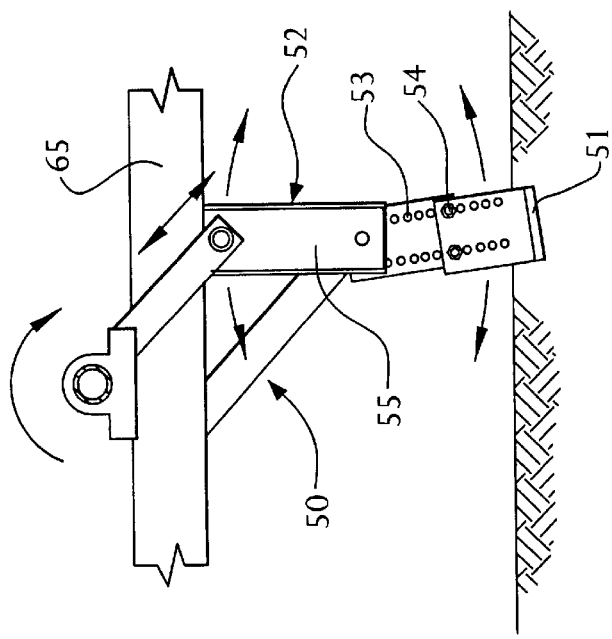
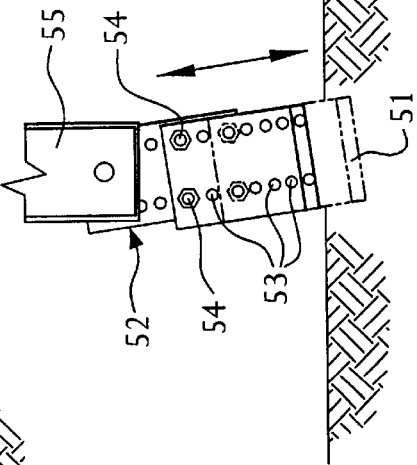
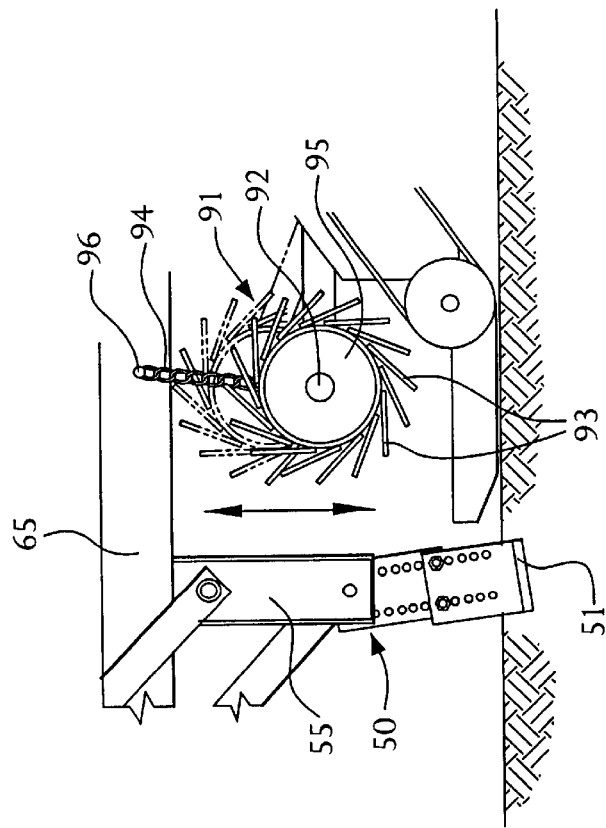
FIG. 10
FIG. 11
FIG. 9

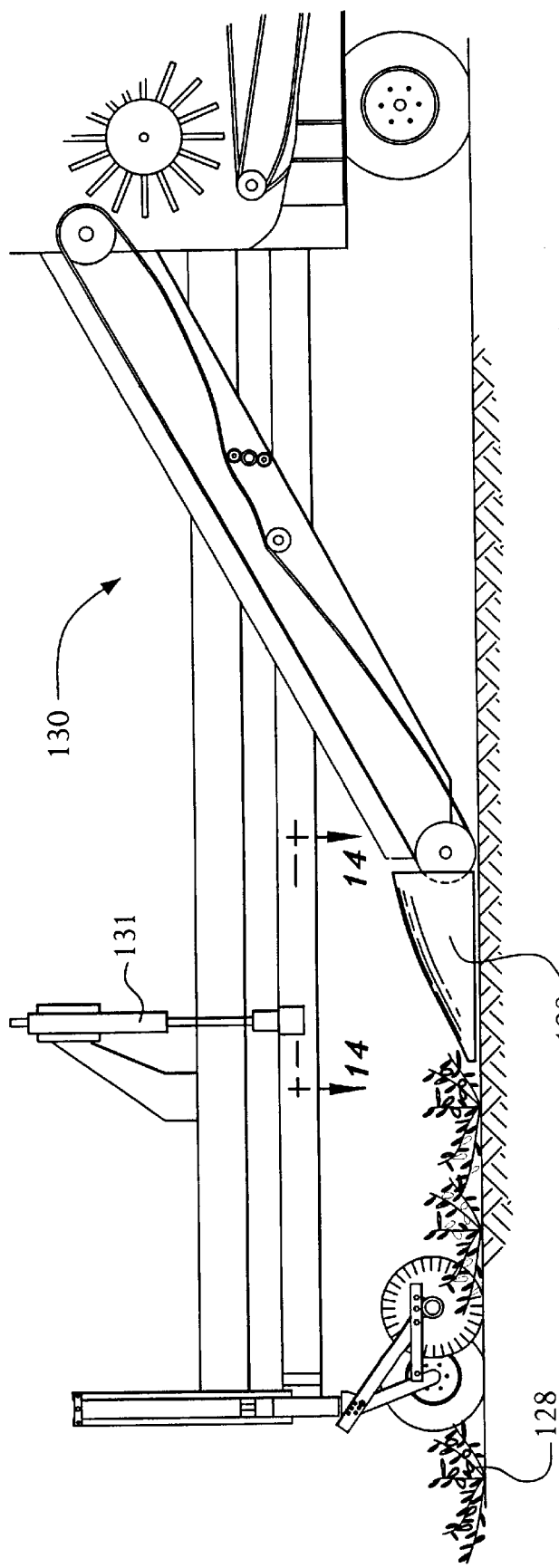
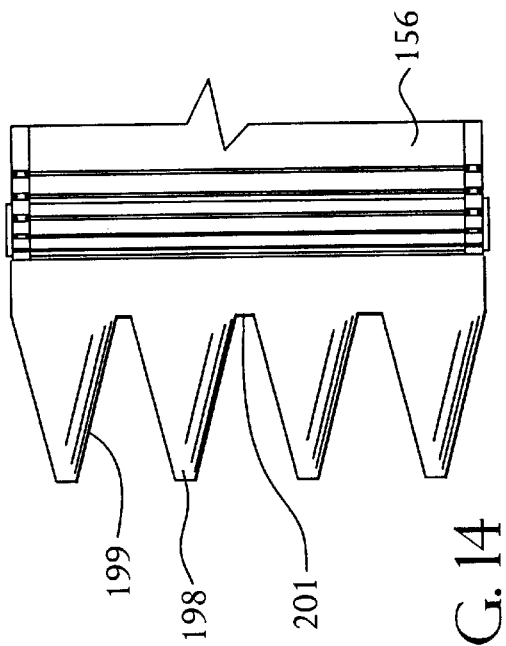
FIG. 13
FIG. 14

FRUIT AND VEGETABLE HARVESTING APPARATUS AND METHODS

CROSS-REFERENCE TO RELATED PATENT APPLICATION

This patent application is based on and claims the priority of provisional United States patent application entitled "Vegetable Harvesting Apparatus and Methods" filed Jun. 29, 1995 and accorded Ser. No. 60/000,709.

FIELD OF THE INVENTION

This invention relates to apparatus and methods for harvesting fruits and vegetables, with special emphasis on harvesting vegetables grown on vinous plants such as tomatoes and cucumbers. The invention also has applicability to harvesting other fruits and vegetables, such as peppers.

BACKGROUND OF THE INVENTION

In order for farmers to effectively compete in the marketplace, efficient and inexpensive crop harvesting techniques must be employed. Accordingly, many farmers have turned to the use of mechanized harvesting equipment. Mechanized harvesters allow for the harvesting of vast tracts of land in a short period of time with only a few workers. Therefore, harvesting machines have the potential of greatly increasing the farmer's productivity.

However, the benefits of known mechanical harvesting machines are overshadowed by the problems encountered when such machines are used to harvest vinous crops such as tomatoes, cucumbers, and peppers. With such crops, vines, rocks, and dirt often clog the chains of conventional chain-type conveyors. Accordingly, the apparatus must be periodically shutdown and cleared of vines, rocks, and other debris.

Another problem associated with the known mechanical harvesters is the large amount of unharvested fruit when the apparatus is used to harvest vinous crops. Typically, a substantial percentage of the fruits are inadequately separated from the vines. As a result, a sizable percentage of the otherwise useable crop yield is simply discarded along with the vines.

Yet another disadvantage of the known mechanical harvesters is that the known harvesters are prone to "dogging". "Dogging" occurs when the apparatus proceeds at an angle or canted to the direction of travel of the tractor which pulls it. The "dogging" tendency results from the tractor pulling the apparatus at a position other than the center of the apparatus so that the force vector applied by the tractor does not pass through the center of gravity of the apparatus.

Cucumbers, especially small size cucumbers, which are referred to in the trade as "pickles", have presented particular problems in mechanical harvesting. Heretofore it has been known to harvest cucumbers and pickles with apparatus utilizing snap rolls to remove the cucumbers and pickles from the growing vines. Snap rolls operate by applying a snap-like force to the rounded end of the pickle or cucumber fruit where it is attached to the vine, with this force tending to separate the pickle or cucumber from the growing vine. A particular problem associated with use of snap rolls is that the pickles and cucumbers, when ripe and desirably picked, are many times damaged in excessive numbers by the snap rolls. Additionally, the snap rolls are often times damaged by dirt and rocks which are entrained in the vine mass when the vine mass is cut from its growing roots. Hence machines utilizing snap rolls to separate cucumbers and pickles from their growing vines are prone to break down and require frequent repair in the growing fields, thereby disrupting the harvesting process.

SUMMARY OF THE INVENTION

The problems associated with the known mechanical harvesters are overcome to a large degree by an apparatus in accordance with the present invention. In one of its aspects, this invention provides a harvesting apparatus for detaching and collecting fruits from vinous plants during travel through a growing field where the apparatus preferably includes a longitudinally elongated frame member adapted to be pulled by a tractor. In this aspect of the invention, a body assembly support housing is preferably connected to the frame member. The body assembly support housing preferably comprises an adjustable length axle which is preferably generally transverse to the frame member. The axle preferably includes a tubular member and a shaft resident within the tubular member. The shaft is preferably extendible from within the tubular member preferably in one transverse direction only respecting the frame member. The apparatus further includes wheels rotatably mounted on respective ends of the axle for supporting the apparatus during travel thereof through the growing field. The apparatus further preferably includes means for maintaining the frame member substantially level when the harvesting apparatus traverses an incline in the growing field.

In another of its aspects, the invention provides a harvesting apparatus for detaching and collecting fruits from vinous plants during travel through a growing field where the apparatus preferably includes an inclined header conveyor for transporting vinous plants preferably upwardly to a position at which the fruits are detached from the plants and collected. The header conveyor preferably comprises a first and a second header chain. These header "chains" consist of bars arranged transversely to the direction of travel of the conveyor and links or linkage members typically manufactured of rubber, which connect the adjacent but spaced apart bars and extend in the longitudinal direction of conveyor or chain travel.

The first header chain is positioned to receive the vine mass preferably as it is detached from its growing roots and preferably convey the vine mass to the second header chain. The second header chain preferably then conveys the vine mass to the position at which the fruits are detached from the vines. The junction between the first and second header chains defines a gap. The gap is preferably adjustable in height from about 0.5 to 1 inch (1.3 to 2.5 cm) up to about 4 inches (10.2 cm). Accordingly, dirt clogs may sit at the gap and be ground up by the action of the header chains until the clogs get small enough to fall through to the ground. The fruit, however, is carried by the second header chain on into the apparatus for processing.

The apparatus in such case preferably includes a cutting bar positioned transversely to the direction of apparatus travel through the growing field, where the bar is generally flat to define a plane. Means are provided for adjustably positioning the bar with the plane defined by the bar at a selected angle to the ground; these means also provide adjustable positioning of the height of the bar thereby to adjust the depth at which the bar cuts growing plants from their roots.

Also, means for oscillating the bar in the plane and generally in the direction of apparatus travel through the growing field may preferably be provided. The bar is positioned at a leading portion of the header conveyor for cutting the vinous plants from their roots for conveyor transport to one or more fruit detachment positions.

Yet another aspect of this invention provides a harvesting apparatus for detaching and collecting fruits from vinous plants during travel through a growing field where the apparatus preferably includes an inclined header conveyor for transporting vinous plants upwardly to a position at which the fruits are detached from the plants and collected. In this aspect, the invention preferably further includes a rotatable reel proximate a pick-up end of said header conveyor, the axis of the reel being transverse to the direction of conveyance of the plants and above the conveyor pick-up end. The reel rotates in a direction such that at closest approach of the reel periphery and the header conveyor, the reel and header conveyor move in a common direction.

Desirably the reel includes generally preferably tangentially or, less preferably, radially, extending members for urging the vinous plants towards the header conveyor beneath the reel, where the members are resilient transversely to the direction of tangency respecting the reel.

The cutting bar aspect of the invention and the rotatable reel aspect of the invention may be combined in a single apparatus. The reel preferably provides a gently, brushing or sweeping motion applied to the cut vine mass to gently sweep the vine mass carrying the fruits or vegetables to be harvested away from the cutting position and upwardly inclined conveyor transport chain. The resilient character of the preferably tangentially extending members associated with the reel provides the gentle sweeping motion to move the fruit carrying vine mass on to the upwardly inclined conveyor without damage to the fruit entrapped within the vine mass.

In yet another of its aspects, this invention provides an improved pick-up or header conveyor where the header conveyor includes a plurality of transversely extending longitudinally separated bars and longitudinally extending linkage means. The linkage means preferably flexibly connect transverse extremities of the bars. Means for removing earth or dirt entrained between the bars of the header conveyor is provided by preferably rotatable apparatus for vibrating the conveyor bars during conveyor travel. The preferably rotatable bar vibration means preferably applies a cyclic relatively low amplitude vibratory motion to the conveyor bars in a direction generally transverse to the direction of conveyor travel to effectuate earth clog removal from between the bars. The earth removal means preferably includes a shaft or bar rotatable about a transverse axis and at least one wheel, pulley or roller mounted on the shaft for rotation about a transverse axis parallel with the shaft axis, to cyclicly displace the conveyor bars generally vertically while the conveyor bars are travelling towards the ground. Accordingly, the conveyor bars are jostled by the earth removal means and earth entrained between the bars falls to the ground.

In another of its aspects this invention provides a plurality of novel combinations and arrangements of means for imparting vibratory motion to the vine mass and conveyors for the vine mass where these elements have been operatively coupled to produce novel combinations providing significantly better vegetable harvesting results than known heretofore. One of these novel combination embraces apparatus for harvesting vinous crops where the apparatus includes cutting means for cutting a food-carrying vine mass of said crop from its growing roots and first vibrating means receiving the vine mass from the cutting means for imparting first vibratory motion to the vine mass to detach fruits from vines of the vine mass. The first vibrating means may preferably include a first rotatable shaker, means for drivingly rotating the first shaker and imparting vibratory motion thereto during rotation thereof, and means, extending from the first shaker, for engaging the vine mass and vibratingly carrying the vine mass along an arcuate path over the first shaker as the first shaker vibratingly rotates. In this combinatorial aspect of the invention, the apparatus further preferably includes transport means receiving the vine mass upon disengagement from the first vibrating means, for transporting the vine mass away from the first vibrating means while permitting fruit detached from the vines to fall therethrough.

In this combinatorial aspect of the invention, the apparatus further includes a second vibrating means. The second vibrating means engages the vine mass, during movement thereof by the transport means, for imparting second vibratory motion to the vine mass during such movement by the transport means. Accordingly, the second vibrating means separates from the vine mass detached fruits remaining entrapped therein after application of the first vibratory motion to the vine mass. In this combinatorial aspect of the invention the second vibrating means may include a second rotatable shaker, means for drivingly rotating the second shaker and imparting vibratory motion thereto during rotation thereof, and means, extending from the second shaker and engaging the vine mass as the vine mass is transported by the transport means, for vibrating the vine mass during conveyance thereof.

This combinatorial aspect of the invention apparatus aspect of the invention yet further preferably includes a vine mass conveyor, below the first vibrating means, for transporting the vine mass upon disengagement from the first shaker to a vine mass discharge position. The vine mass conveyor preferably includes a plurality of transversely extending longitudinally separated bars and longitudinally extending endless ribbon-like means for flexibly connecting preferably transverse extremities of the bars.

A fruit conveyor is also preferably positioned below the first vibrating means, where the fruit conveyor is preferably at least partially within and below the vine mass conveyor. The fruit conveyor catches and conveys fruit separated from the vines to a fruit discharge position. The fruit conveyor preferably includes at least one conveyor comprising a plurality of transversely extending longitudinally separated bars and longitudinally extending endless ribbon-like means for flexibly connecting transverse extremities to the bars.

In yet another of its aspects, the invention provides a fruit conveyor as a drive for the vine mass conveyor. In this embodiment, longitudinally extending endless ribbon-like means of the vine mass conveyor further comprise a plurality of evenly spaced lugs on inwardly facing portions of the ribbon-like flexible connecting means. The ribbon-like means of the fruit conveyor further includes a plurality of evenly-spaced lugs on outwardly facing portions of the ribbon-like flexible connecting means which are adapted for interlocking engagement with the lugs of the ribbon-like flexible connecting means of the vine mass conveyor along a portion of the travel loop defined by the endless vine mass conveyor, thereby facilitating driving advancement of the vine mass conveyor by the fruit conveyor.

The apparatus aspect of the invention yet further embraces a separator for receiving the fruits from the fruit conveyor for mechanically size-sorting the fruits according to a predetermined thickness or diameter from the remaining fruits, where the sorting means includes an endless conveyor. Forming a portion of the endless conveyor are a plurality of transversely extending bars longitudinally separated from one another at spacings equal to the predetermined maximum or minimum desired thickness of the fruits. Longitudinally extending endless ribbon-like means flexibly connect transverse extremities of the bars.

The separator further includes means for depositing the fruits on the bars and orienting the fruits with their longitudinal axes parallel with the bars. It is to be understood that in this context "thickness" denotes the overall dimension of a fruit or vegetable.

The invention is specifically adapted to the size sorting of cucumbers or pickles in which case the "thickness" denotes the outer diameter of the pickle or cucumber of interest as opposed to the length.

As used in this patent application it is to be understood that the term "pickle" denotes small size cucumber vegetables and this is consistent with the terminology used by cucumber farmers, cucumber and harvesters and others involved in the trade.

In another of its aspects, this invention provides a method for harvesting vinous crops including the steps of cutting a fruit-carrying vine mass from its growing roots. The cut vine mass is carried along a first arcuate path by first lifting the vine mass and then lowering the vine mass while imparting vibratory motion to the vine mass to detach fruit from the vine mass. Fruit detached from the vine mass is caught and then conveyed to a discharge position. During this conveyance a second vibratory motion is imparted to the vine mass. Fruits which had been detached from the vines but remained entrapped in the vine mass are separated from the remaining vine mass by application of the second vibratory motion thereto during preferably essentially longitudinal conveyance. Those fruits are caught and conveyed to the discharge position.

In the method aspects of the invention, the vibratory motion may be imparted to the vine mass by engaging the vine mass with tines extending radially from a rotatable shaker. The linear speed of the tine tips along the conveying means while proximate thereto preferably matches the speed of the vine mass transport means.

In yet another of its aspects, this invention provides a method for harvesting cucumbers, without application of compressive force to the cucumbers such as is the case with conventually snap roll harvesting to remove cucumbers from their growing vines, wherein the method includes the step of cutting cucumber-bearing vines from their growing roots. The cut vines are carried along a first arcuate path by first lifting and then lowering those vines while imparting vibratory motion to those vines to detach cucumbers from those vines. Detached cucumbers falling from those vines are caught and conveyed to a discharge position. The vines are then preferably conveyed along a preferably linear path preferably while imparting second vibratory motion thereto to release detached cucumbers remaining entrapped in those vines. Falling cucumbers released from those vines by application of the second vibratory motion are caught and conveyed to the discharge position.

In the cucumber harvesting method aspect of the invention, vibratory motion is preferably imparted to the vines by engaging the vines with tines extending radially from a rotatable shaker while the vines are being linearly conveyed. The linear speed of the tine tips preferably matches the speed of conveyance of the vines. Further in the cucumber harvesting aspect of the invention, the cutting is preferably performed vibratingly.

The cucumber harvesting aspect of the invention may further embrace the steps of conveying the vines from where they are cut from their growing roots upwardly to the first vibrating means and urging the vines onto an upwardly inclined conveyor for conveyance thereof upwardly by preferably brushing the vines as they are cut from their roots towards the conveyor with resilient flaps, extending preferably tangentially from a rotating reel where the flaps at the position of closest approach to the conveyor, preferably move in the direction of conveyance.

BRIEF DESCRIPTION OF THE DRAWINGS

The foregoing summary, as well as the following detailed description of the preferred embodiments of the present invention, will be better understood when read in conjunction with the accompanying drawings, in which:

FIG. 7 is an enlarged, schematic broken, side elevation view of the embodiment of the vibrating means forming a portion of the vegetable harvesting apparatus illustrated in FIGS. 1 and 6, where the view has been taken within the vegetable harvesting apparatus;

FIG. 8 is an enlarged broken view taken at dashed circle in FIG. 7;

FIG. 9 is an enlarged, broken, side elevation view of the cutting means, first header chain and feed reel forming a portion of the vegetable harvesting apparatus illustrated in FIGS. 1 and 6;

FIG. 10 is an enlarged, broken, side elevation view of the cutting means illustrated in FIG. 9 showing the manner in which the cutting bar is adjustable;

FIG. 11 is an enlarged, broken side elevation view of the cutting bar shown in FIG. 10 further showing the manner in which the cutting bar is adjustable;

FIG. 13 is a broken schematic side elevation of another embodiment of vegetable harvesting apparatus manifesting aspects of the invention;

FIG. 14 is a top view of a vegetable harvesting head portion of the apparatus of FIG. 13 take and looking in the direction of the arrows 14—14 in FIG. 13;

DETAILED DESCRIPTION TO THE PREFERRED EMBODIMENTS AND THE BEST MODE KNOWN FOR PRACTICING THE INVENTION UNDER 35 USC 112

Figure 1:
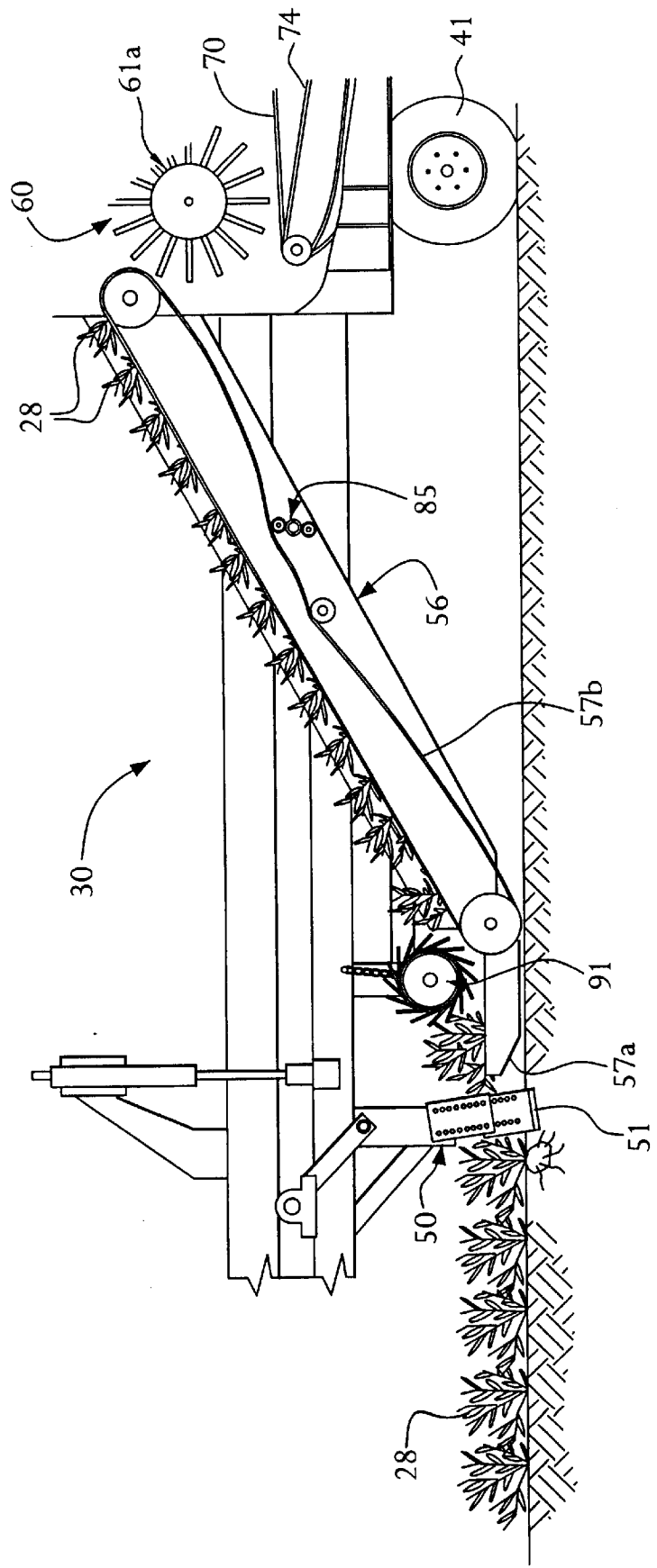
FIG. 1 is a broken side schematic elevation of a first embodiment of vegetable harvesting apparatus manifesting aspects of the invention.
Figure 6:
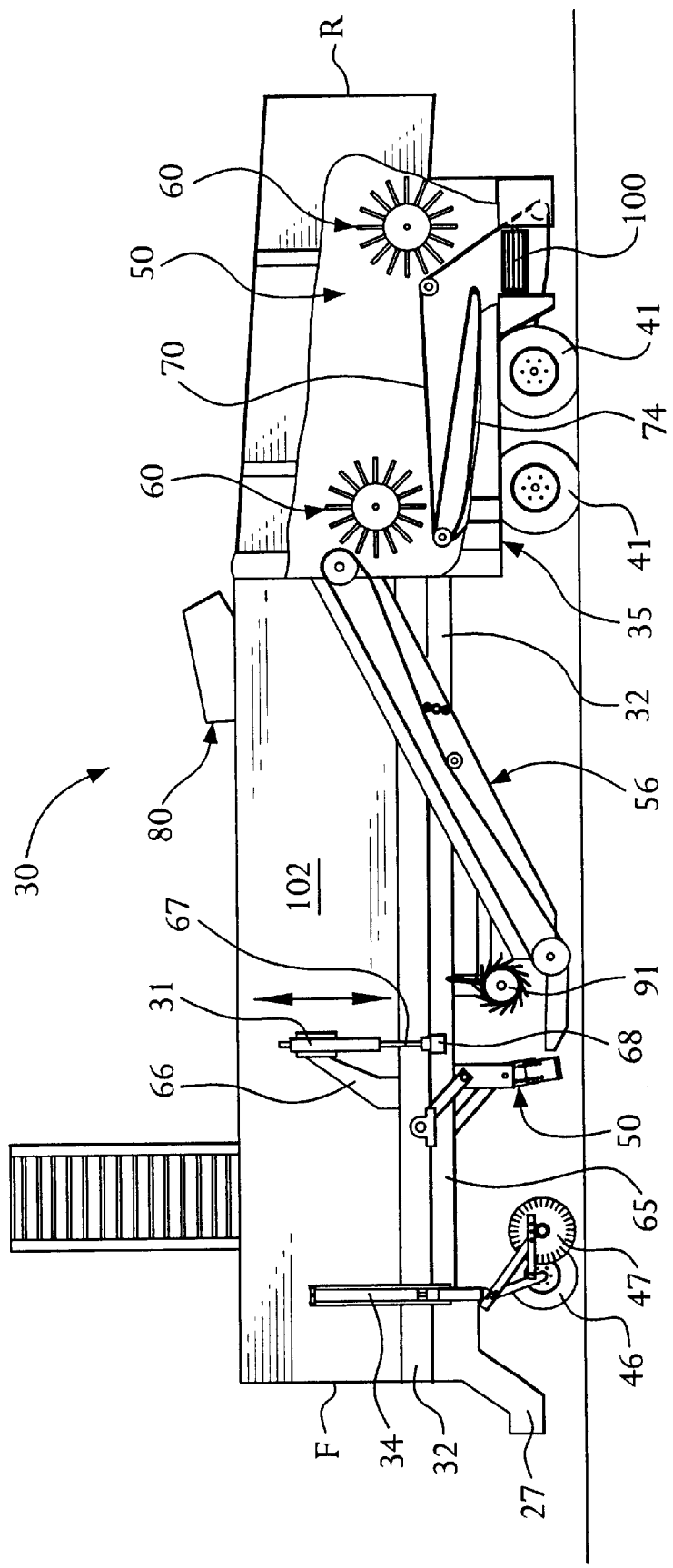
FIG. 6 is a side elevation of the vegetable harvesting apparatus illustrated in FIG. 1 with the apparatus configured for travel to a harvesting locale.

Referring to FIGS. 1 and 6, a fruit/vegetable/vinous crop harvesting apparatus 30 in accordance with the present invention is shown. Apparatus 30 travels through a growing field in the direction indicated by arrow T in FIG. 6.

The apparatus 30 comprises a frame member 32 adapted to be pulled by a tractor (not shown) via a hitch 27. The frame member 32 comprises a single longitudinal frame to which a body assembly support housing 35, a cutting means 50, a header conveyor 56, a vibrating means 60, a vine mass conveyor 70, a fruit conveyor 74 and a separator 80 are mounted. The body assembly support housing 35 is positioned at the rear end R of the frame member 32 for providing wheels 41 upon which the apparatus 30 moves. The cutting means 50 is positioned towards the front end F of the frame member 32 for cutting a vine mass 28 having fruit 29 growing thereon from its growing roots.

The header conveyor 56 is positioned behind the cutting means 50 for transporting the cut vine mass 28 to the vibrating means 60. The vibrating means 60 receives the cut vine mass 28 from the header conveyor 56 and separates or breaks the fruit 29 from the vine mass 28. The vine mass conveyor 70 is provided to receive the vine mass 28 from the vibrating means 60 and transport the vine mass 28 to a vine mass discharge position. The fruit conveyor 74 receives the fruit from the vibrating means 60 as the fruit falls through the vine mass conveyor 70, and transports the fruit to one or more intermediate conveyors 100 which in turn transport the fruit to an appropriate discharge position or to separator 80 if separator 80 or its equivalent is provided.

The separator 80 may optionally be provided according to the fruit being harvested, for sorting the fruit (which has been separated from vine mass 28) according to size.

Frame member 32 is preferably an elongated steel beam, further preferably having a box-like configuration and is the member on which various parts of the harvesting apparatus are mounted. The harvesting apparatus has been illustrated in the drawings in many instances without the external sheet metal housing, which has been designated generally 102 in FIG. 6 and which generally encloses the vibratory mechanisms, specifically the shakers, which apply vibration to the vine mass to separate the fruits from the vine mass and to facilitate the harvesting. The sheet metal housing 102 further preferably encloses certain of the fruit and vine mass conveyors, to shield these conveyors from the weather, which facilitates use of the harvesting apparatus in foul weather conditions when that becomes necessary. The sheet metal housing 102 is preferably sheet metal but it may be plastic panels or other suitable materials such as carbon fiber or other light weight high strength materials, at the designers option.

The body assembly support housing 35 which includes the extendible axle and other portions of the running gear is preferably fabricated from a series of steel tubular members with suitable bearings and the like to facilitate the rotary motion of the wheels on their individual stub axles and to facilitate sliding elongation of the extendible axle, etc. Steel is preferred for these members in view of its strength, resistance to bending and relatively low cost.

Figure 19:
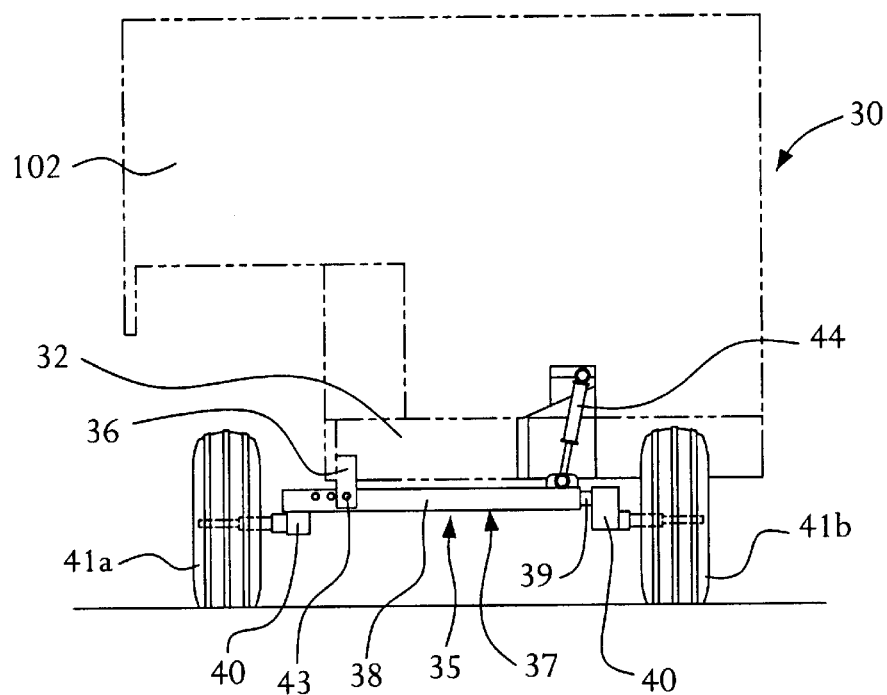
FIG. 19 is a schematic, end view of the apparatus, in elevation, as viewed looking from the left in FIG. 6, with an extendable axle in a retracted position.
Figure 20:
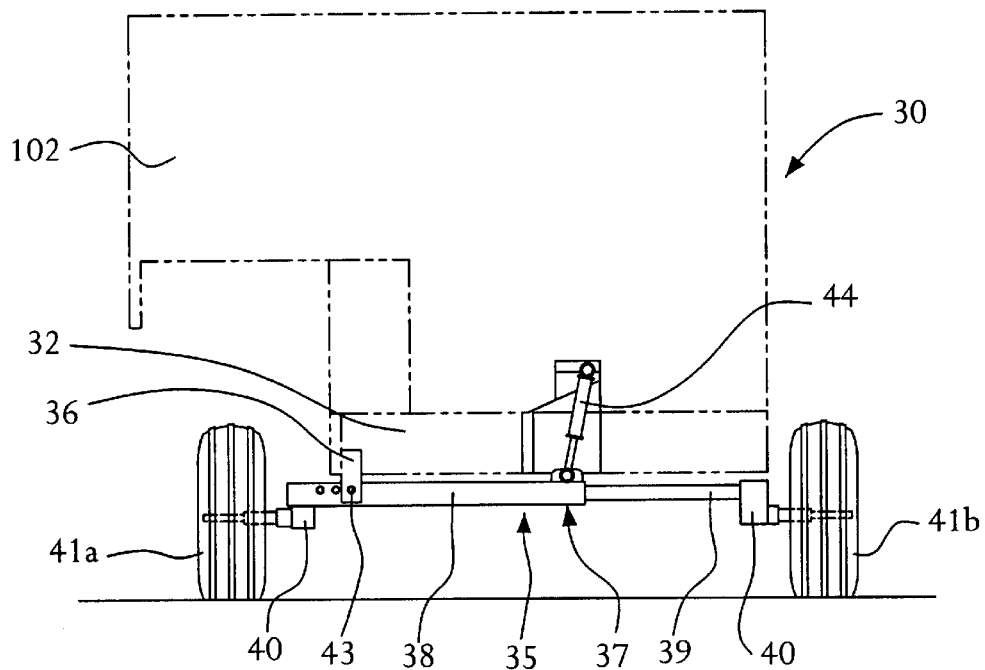
FIG. 20 is a view similar to FIG. 19, with the extendable axle extended.

Referring to FIGS. 19 and 20, the body assembly support housing 35 comprises a yoke 36 having a downwardly extending portion, which is positioned on the bottom of the frame member 32. Yoke 36 provides the main connection between frame member 32 and extendible axle 37 and is essentially the means by which the frame member 32 and sheet metal housing 102 are connected to the body assembly support housing 35 for transport.

Mounted within yoke 36, transversely to frame member 32, is an extendable axle designated generally 37. The extendable axle 37 preferably comprises a rectangular tubular external member 38. Within the rectangular external tubular member 38 and mounted on suitable bearings is an extendible shaft or tube 39 on which one of two rocker beams 40 is mounted; a second rocker beam 40 is provided connected to the end of tubular external member 38 at the end thereof opposite that from which extendible shaft 39 emerges. Wheels 41 are mounted using suitable stub shafts and bearings on the rocker beams 40.

Figure 23:
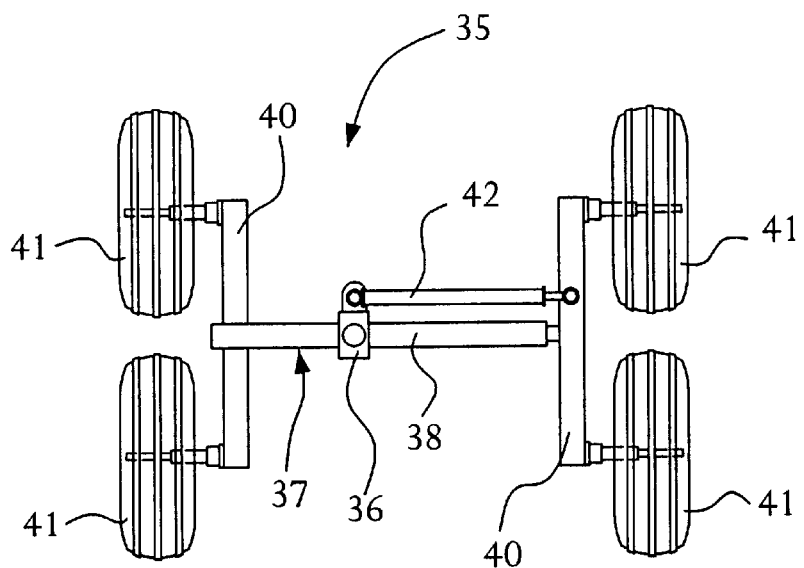
FIG. 23 is a top view of the extendable axle and associated structure in the configuration shown generally in FIGS. 19 and 21.
Figure 24:
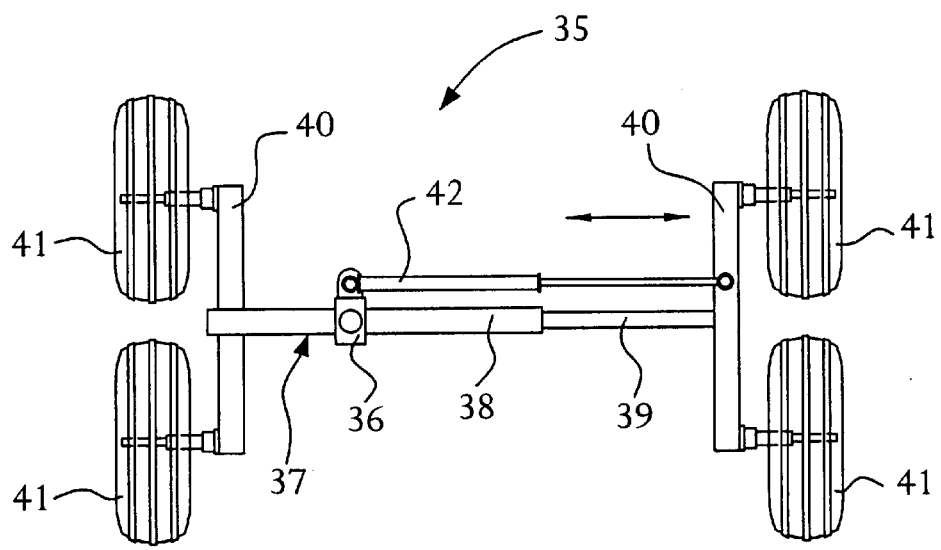
FIG. 24 is a top view of the extendable axle and associated structure in the configuration shown generally in FIGS. 20 and 22.

As best shown in FIGS. 23 and 24, the extendible shaft 37 is moved by a hydraulic cylinder 42 positioned on the outside of the rectangular tubular member 38 and forward of it. Rollers (not shown) and bearings are desirably provided within the tubular member 38 portion of axle 37 to facilitate the extension of the rectangular shaft 39. The shaft 39 can preferably be extended up to 4 feet (1.2 m) or even more.

Figure 21:
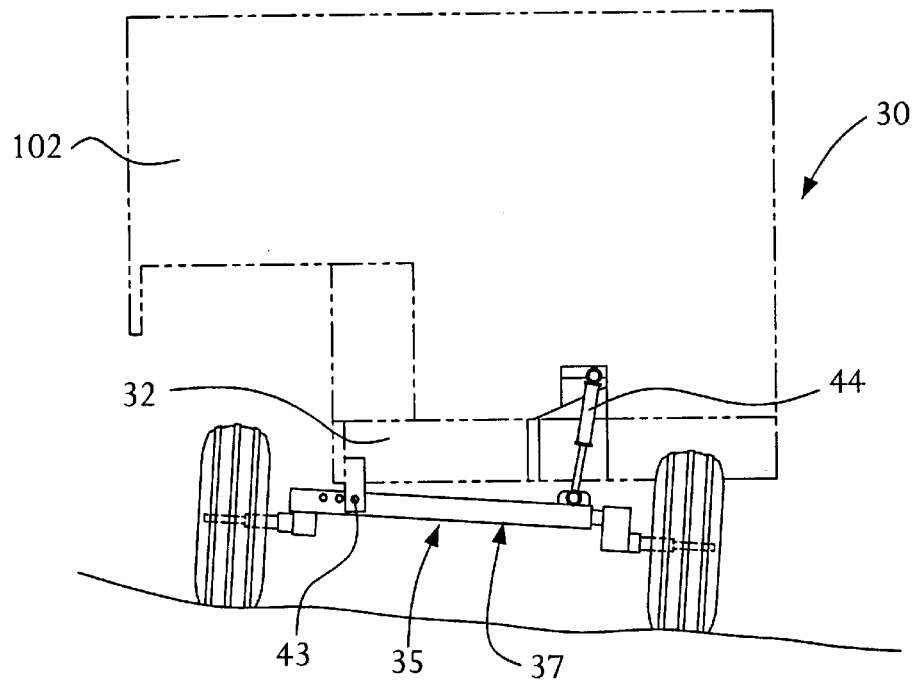
FIG. 21 is a view similar to FIG. 19, showing the extendable axle in a retracted position with the apparatus on hilly ground.
Figure 22:
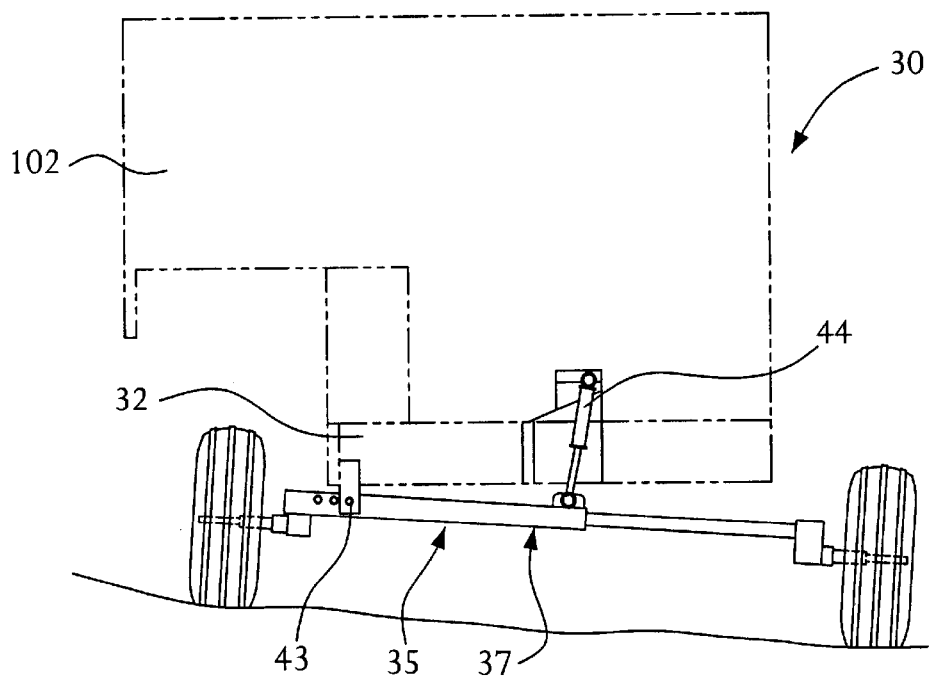
FIG. 22 is a view similar to FIG. 20, showing the axle extended with the apparatus on hilly ground.

As shown in FIGS. 19 and 20, a pin 43 is provided which passes longitudinally through the yoke 36 of the apparatus 30. Pin 43 acts as a pivot about which leveling rotation may take place to level the frame 32, sheet metal housing 102 and other components mounted on frame 32 with respect to the horizontal. A hydraulic piston-cylinder combination 44 is connected to an unnumbered extension portion of frame member 32 via a pivotal connection and to the rectangular tubular member 38 also via a suitable pivotal connection. As shown in FIGS. 21 and 22, the hydraulic piston-cylinder combination 44 provides a leveling function which maintains the frame member 32 substantially level when the apparatus 30 traverses an incline; hydraulic piston-cylinder combination 44 provides this function by extending or retracting the piston member thereof thereby raising or lowering the parts of the harvesting apparatus attached to frame member 32 when the apparatus is on inclined ground as illustrated in both FIGS. 21 and 22. Control of hydraulic piston-cylinder combination 44 is performed by the operator via suitable remote controls to actuate hydraulic piston-cylinder combination 44 from the operators seat on the tractor.

Figure 25:
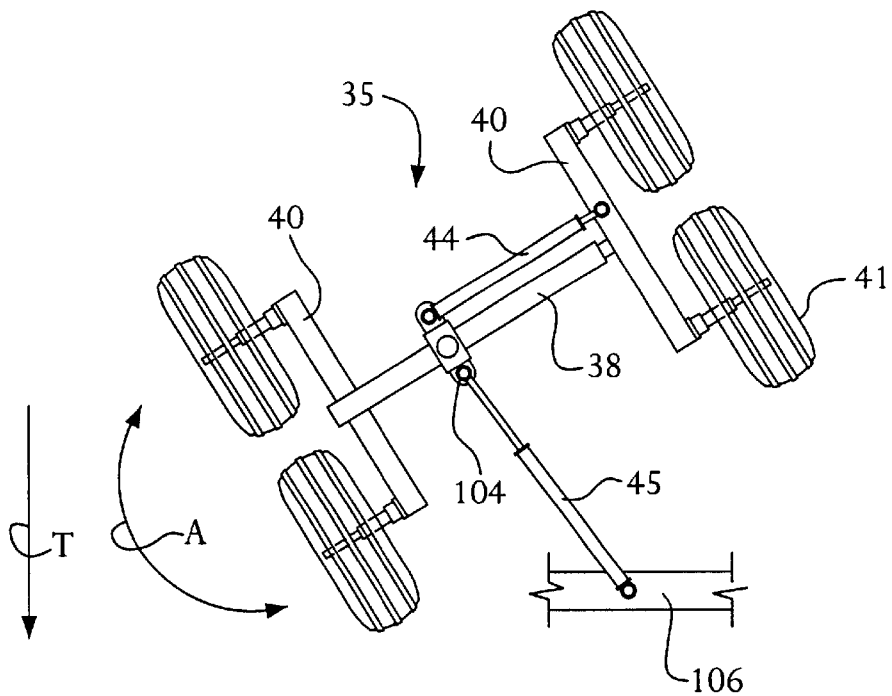
FIG. 25 is a top view of the extendable axle and associated structure in the configuration shown generally in FIG. 23 illustrating steering compensation.
Figure 26:
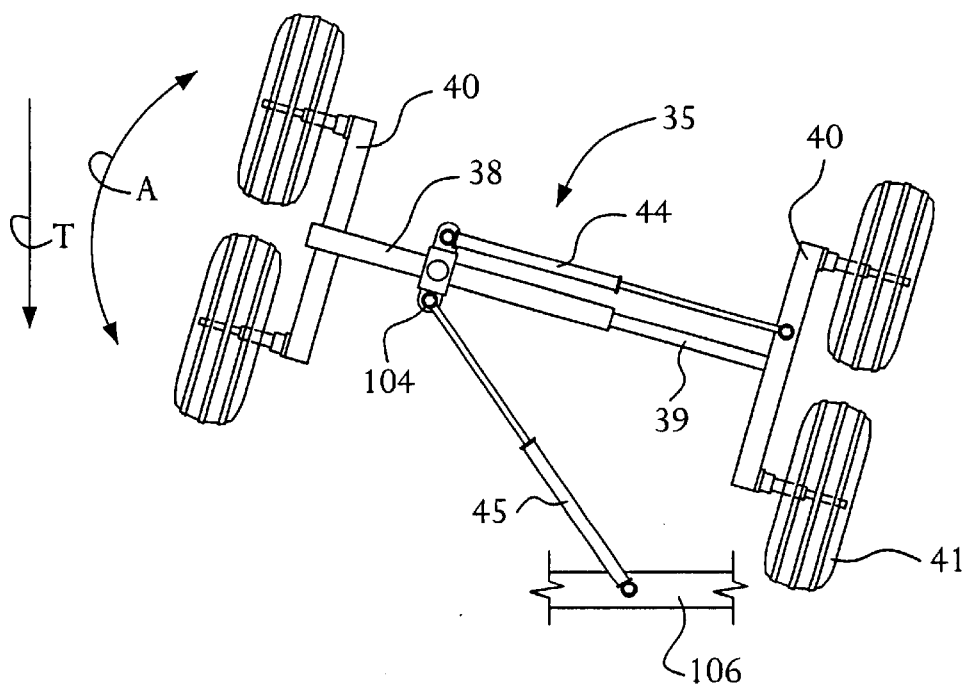
FIG. 26 is a top view of the extendable axle and associated structure in the configuration shown generally in FIG. 24 illustrating steering compensation.

As best illustrated in FIGS. 25 and 26, another hydraulic piston-cylinder combination 45 is connected via an ear 104 and pivotal connection thereto to the tubular member 38 of the axle 37 to provide steering compensation. It is within the purview of the invention to have the steering automatically connected to, or be operated with, the steering of the tractor. Most desirably the steering compensation is controlled by a manual control provided for the operator driving the tractor so that the operator can adjust the steering compensation by controlling operation of piston-cylinder combination 45. Specifically, as illustrated in FIGS. 25 and 26, piston-cylinder combination 45 is connected between ear 104 which is rigidly connected to rectangular tubular member 38 and a frame extension member 106 which is rigidly connected to frame member 32. By actuating piston-cylinder combination 45, the operator can effectuate rotation of the body assembly support housing 35 as generally indicated by arrow A so as to rotate body assembly support housing 35 relative to the frame 32 and the longitudinal direction of travel of the harvesting apparatus through the field as indicated by arrow T in FIGS. 6 and 26. Consequently, body assembly support housing 35 is rotated relative to the direction of travel and provides compensatory offset, counteracting the tendency of the harvesting apparatus to dog as it is pulled through a growing field. The dogging characteristic is provided by the increased resistance to travel due to the cutting action of the cutting bar and the fact that the force vector resulting from such cutting is displaced from the force vector applied by the tractor pulling the apparatus through the field. This displacement of the force vector resulting from the cutting operation tends to produce a moment tending to rotate the harvesting apparatus thereby producing the dog effect for which the piston cylinder combination 45 illustrated in FIGS. 25 and 26 provides compensation.

Referring again to FIG. 6, one or more gauge wheels 46 are attached to a laterally cantilevered member extending laterally outwardly from frame member 32 at a position at the approximate longitudinal location illustrated generally in FIG. 6, close to the front end F of harvesting apparatus 30. The gauge wheels 46 can be raised or lowered from the tractor seat by means of at least one hydraulic cylinder 34 that is vertically oriented and affixed to the member which extends in cantilevered fashion from frame member 32, laterally therefrom at the front end F of the frame member 32. A cantilevered support arm 66 extends laterally and upwardly from frame member 32 and has affixed thereto at the end thereof remote from connection with frame 32 a hydraulic piston-cylinder combination 31 which is vertically oriented as illustrated in FIG. 6. The rod portion of piston-cylinder combination 31, which has been designated 67 in the drawings, is connected to a cross-bar 68 which extends laterally across the vinous crop take-up area in a direction generally parallel with the cutting bar, and transversely to the direction of travel through the growing field.

Figure 12:
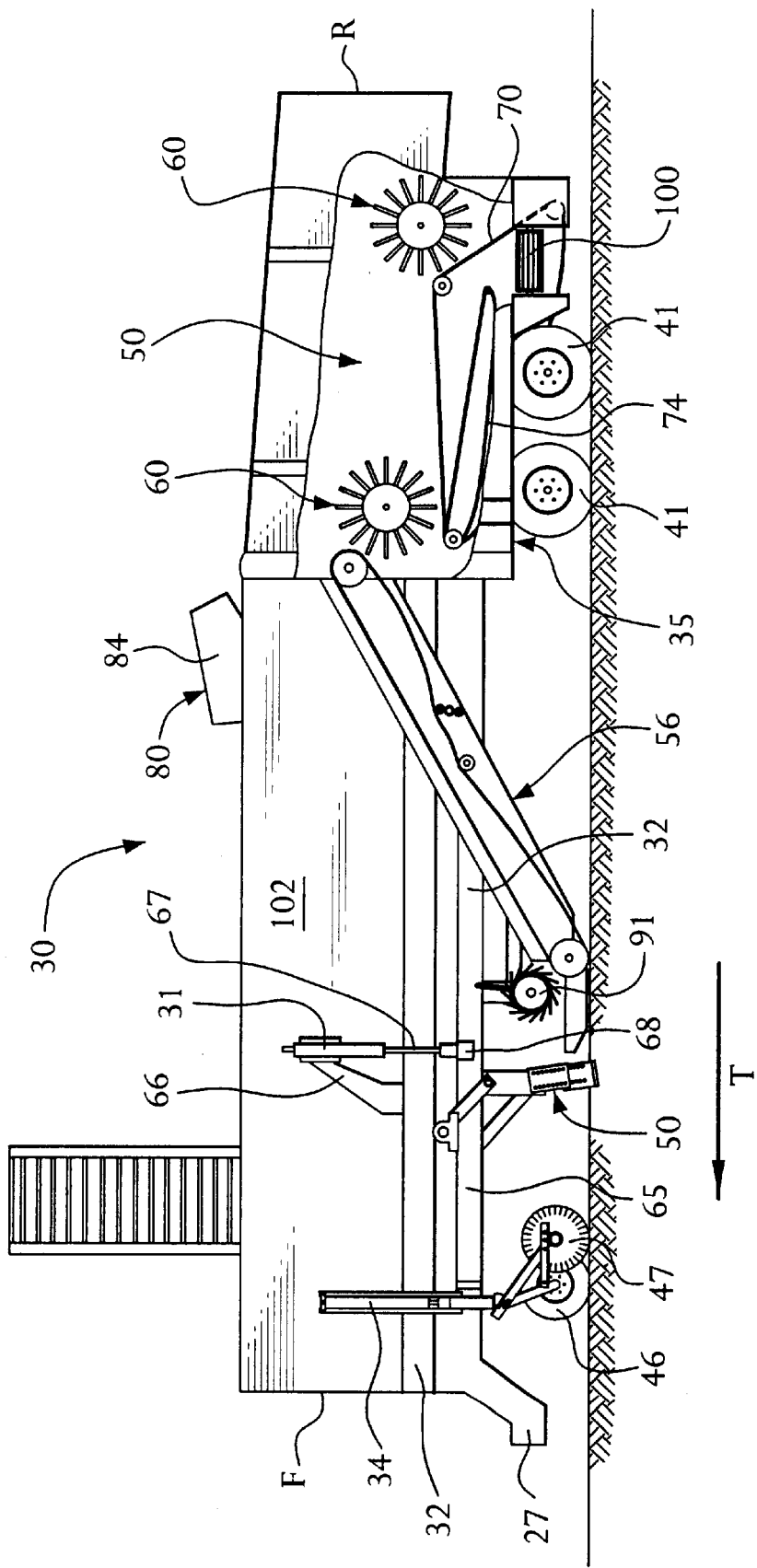
FIG. 12 is a schematic side elevation of the vegetable harvesting apparatus illustrated in FIGS. 1 through 11 with the apparatus configured to harvest the fruits and vegetables, as opposed to being configured for travel as illustrated in FIG. 6.

Actuation of hydraulic piston-cylinder combination 31 permits raising and lowering of the entire vine mass cutting assembly together with gauge wheels 46, coulters 47 and piston-cylinder combinations 34 which control the height of gauge wheels 46 vis-a-vis cross bar 68 and hence with respect to frame member 32. Hence, cantilevered support arm 66 provides a weight bearing member for transferring the weight of the assembly including gauge wheels 46, coulters 47 and the vinous row crop cutting means to the frame member 32 when the gauge wheels are raised and in a non-weight supporting position, as illustrated in FIG. 6, when the apparatus is in a transport mode as opposed to a harvesting mode as illustrated in FIG. 12. When the apparatus is configured as illustrated in FIG. 12, gauge wheels 46 bear a substantial portion of the weight of coulters 47 and the vinous row crop cutting and feeding means, discussed below, to transfer that weight to the harvesting field.

Figure 5:
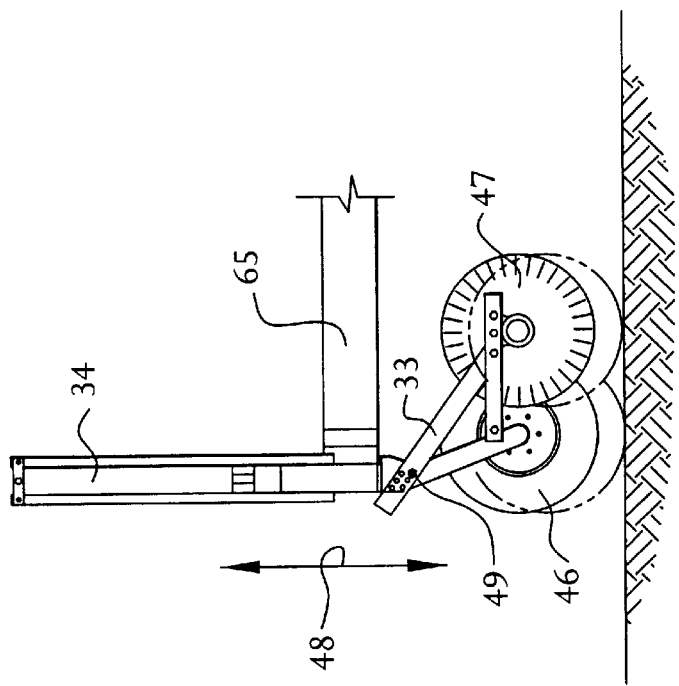
FIG. 5 is a view similar to FIG. 4 but with the vine row cutting means shown in a raised position.
Figure 4:
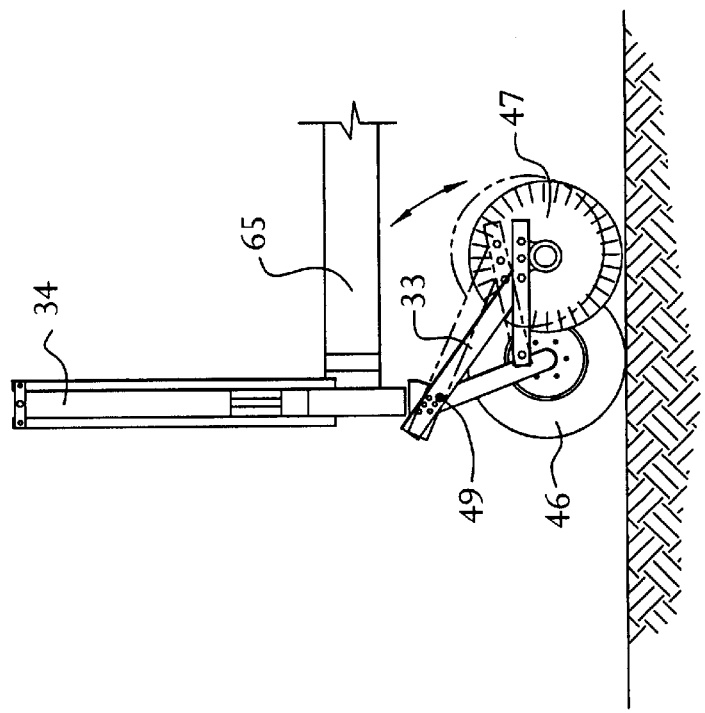
FIG. 4 is a broken side elevation of a vine row cutting means portion of apparatus illustrated more completely in FIG. 6, with the vine row cutting means shown in a lowered position.

As best shown in FIGS. 4 and 5, the apparatus 30 further includes a circular, vertically oriental cymbal-like, vine row cutting means or coulter 47 operatively associated with the gauge wheels 46. The vine row cutting means 47 is provided for cutting the vine mass 28 in a longitudinal line parallel with the direction of travel of the harvesting apparatus 30 through the field. Accordingly, the vine row cutting means 47 separates the portion of the vine mass 28, from which the fruits 29 are to be harvested upon a given traverse through a field from the vine mass 28 which is not to be cut and is to remain on the ground during that pass of the apparatus 30 through the field.

The vine row cutting means or coulters 47 are preferably raised and lowered along with the gauge wheels 46. Means may be provided for raising coulters 47 independently of gauge wheels 46. If so provided, such means would preferably be hydraulically driven, preferably hydraulic piston-cylinder combinations of the type used elsewhere in connection with control of various components of this apparatus. Coulter 47 depth is also adjustable preferably independently of the wheels 46, by adjusting the bolt 49 and connecting rod 33 associated with them. The coulters 47 are preferably set to cut about 3 inches (7.62 cm) deeper than wheel 46 and are used to cut the vine mass 28 so that there is a nice clean cut or edge provided as each row is harvested. Depth of cut for which coulter 47 is set depends on the crop being harvested and the field conditions namely whether the crop is wet or dry and whether the soil is wet or dry.

Referring to FIG. 5, the wheel 46 and vine row cutting means 47 are shown in a raised position whereby the gauge wheels 46 and vine row cutting means 47 are positioned above the ground. Such lifting of gauge wheels 46 and vine row cutting means 47 is effectuated by operation of hydraulic piston-cylinder combination 34 which works to lift the wheels and vine row cutting means relative to a longitudinal support member 65 which is preferably connected to and carried by cross bar 68 so that there is relatively rigid structural connection between longitudinal support member 65 and frame member 32 such that actuation of piston-cylinder combination 34 effectively raises or lowers wheels 46 and cutting means 47 relative to longitudinal support member 65 and hence frame member 32.

In the arrangement illustrated in FIG. 5 in which the wheels are raised, the vine row cutting means 47 does not cut the vine mass 28. The vertical double-ended arrow 48 in FIG. 5 illustrates the upper and lower adjustability of the wheel 46 and vine row cutting means 47 relative to longitudinal support member 65 and hence with respect to the ground.

Connection of cutting means 50 to frame member 32 is illustrated in FIGS. 9 through 11. Cutting means 50 preferably comprises a cutting bar 51 which extends transversely to the direction of travel of the harvesting apparatus 30 through the growing field. Further, the cutting bar 51 is preferably flat to generally define a plane. The apertures illustrated in FIG. 10 provides positioning means 52 for adjustably positioning cutting bar 51 with the plane defined by the cutting bar 51 at a selected angle with respect to the ground and for positioning depth of cut of cutting bar 51.

An enlarged view of a portion of the structure illustrated in FIG. 10, schematically showing positioning means 52 of cutting means 50, is shown in FIG. 11. Cutting bar positioning means 52 comprises a vertically oriented channel-like member 55 which is pivotally mounted to the bottom of member 65 which is a longitudinally extending member supported by and attached to cross-bar 68; longitudinally extending member 65 is preferably provided in pairs, on either side of the take up reel, discussed below, to provide support for the cutting bar 50 and and associated structure on either end thereof.

The cutting bar 51 is adjustable height-wise by positioning bolts 54 within a series of holes 53 that are apparent from the outside of the frame member 32. To move the cutting bar 51 toward the front of apparatus 30, positioning means 52 is unbolted and moved along longitudinal support member 65 forward from where shown, in order to move the cutting bar 51 forward.

Adjustment of the cutting bar 51 angle is made by means of bolts 54 which go into one of three holes 53 in vertically oriented channel-like member 55. To change the cutting bar 51 angle, one removes the bolt 54 that is facing inwardly, adjustment is made of the cutting bar 51 angle and the bolt 54 is put back into the new hole 53 which has become available because of the change in position of the cutting bar 51.

The height of the cutting bar 51 above the soil, or the depth of the bar 51 within the soil, will vary with conditions. Similarly, the cutting bar 51 angle will vary according to cutting conditions. For example, in cutting and harvesting cucumbers growing in sandy soil, the cutting bar 51 may be positioned about 2 inches (5.08 cm) below the bottom of the first header chain 57a. This prevents the first header chain 57a from digging into the dirt. Accordingly, the cutting bar 51 extends into the soil to a depth of about 0.5 inch (1.27 cm) which is desirable for conditions which are dry, with sandy soil. In that regard, the heavier the soil, preferably the lesser the depth of the cutting bar 51 to avoid or to minimize the amount of soil picked up by the first and second header chains, 57a and 57b. The depth of the cutting bar 51 may be as great as 1 inch (2.54 cm) or even greater in sandy soil.

Figure 2:
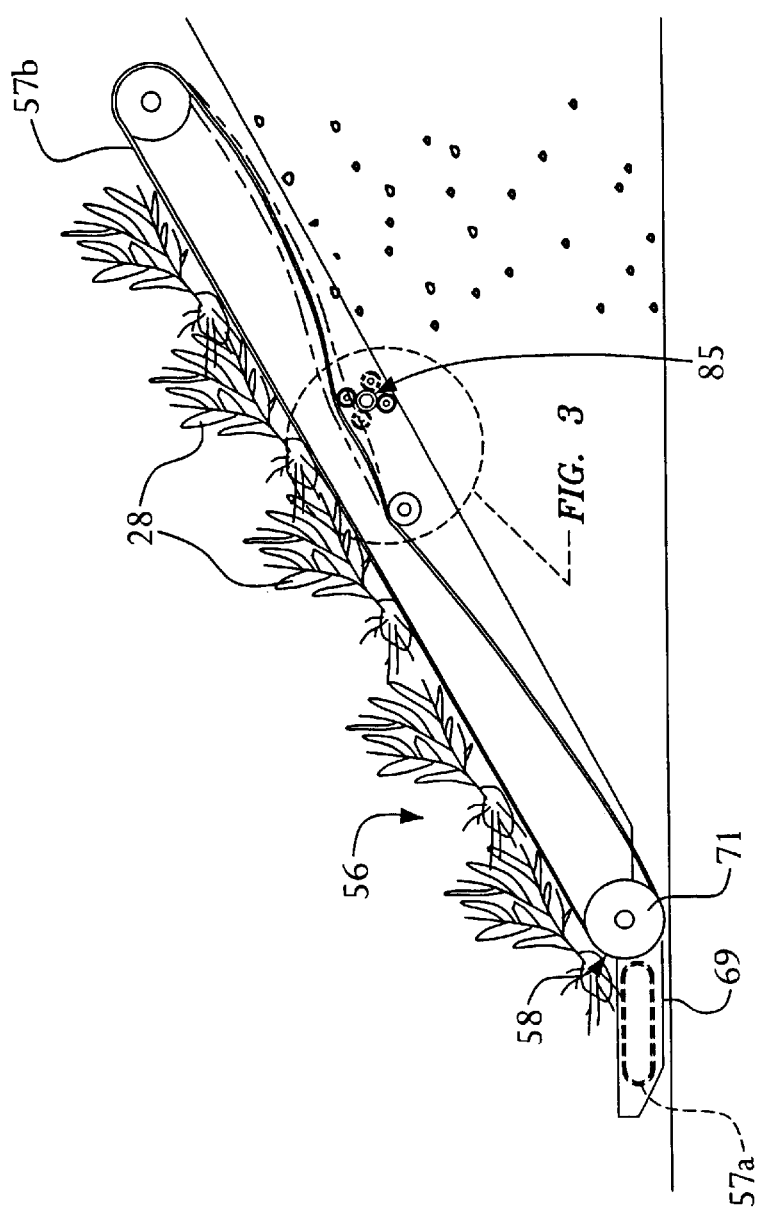
FIG. 2 is an enlarged side elevation of a header conveyor portion of the apparatus shown in FIG. 1.

As best shown in FIG. 2, the header conveyor 56 comprises an upwardly inclined, endless conveyor which transports the vine mass 28 upwardly from the ground after being cut from the roots by cutting bar 51. The header conveyor 56 preferably comprises a first header or pick-up chain 57a and a second header or pick-up chain 57b. First header or pick-up chain 57a is shown in dotted lines and is indicated as being invisible in FIG. 2 since it is shielded by shield 69.

The first header chain 57a is preferably positioned to receive the vine mass 28 as it is detached from its growing roots, to convey the vine mass 28 to the second header chain 57b. The second header chain 57b then preferably conveys the vine mass 28 to the position at which the fruits 29 are detached from the vine mass 28. The first and second header chains, 57a and 57b, preferably include a plurality of transversely extending longitudinally separated bars (not shown) and longitudinally extending links serving as means for linking together the adjacent but longitudinally separated bars of the header chains means (not shown). The linkage means preferably flexibly connect transverse extremities of the bars. However it is to be understood that the linkage means may be inboard from the transverse extremities of the bars and still function acceptably.

The junction between the first and second header chains, 57a and 57b, defines a gap 58 which is occluded in FIG. 2 by a sprocket schematically illustrated as 71 and provided for second header chain 57b at the lower end thereof. The gap 58 is preferably adjustable from about 0.5 to 1 inch (1.3 to 2.5 cm) up to about 4 inches (10.2 cm). The gap 58 is adjusted depending upon conditions in the field. Adjustment of gap 58 is affected by suitable adjustment of the proximate sprockets, one of which is designated 71 and FIG. 2 and the other of which is not illustrated in FIG. 2, for the first and second header chains 57a and 57b respectively and may be effectuated by mounting screw adjustment of such sprockets. Accordingly, dirt clogs may sit at the gap 58 and be ground up by the action of the header chains, 57a and 57b, until the clogs get small enough to fall through to the ground. The fruit 29, however, is carried by the second header chain 57b on into the apparatus 30 for processing.

It may be desirable in some cases to make the second header chain 57b higher or further up the ramp and actually position it above the position of alignment with the first header chain 57a. There are preferably a number of different holes (not shown) in the frame member 32 for positioning the second header chain 57b and adjusting the spacing of the second header chain 57b with respect to the first header chain 57a.

Regarding the height of the first header chain 57a, it is important that the cutting bar 51 be below the level of the first header chain 57a in order that the first header chain 57a not dig into the ground.

Figure 3:
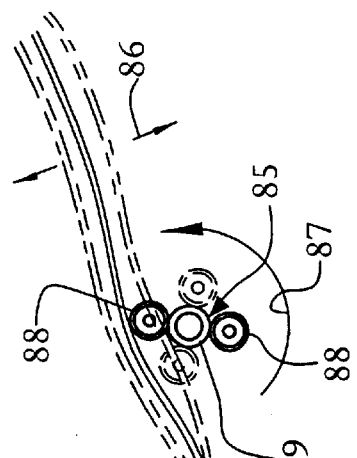
FIG. 3 is an enlarged view taken at the dotted circle in FIG. 2.

Referring to FIG. 2 and especially to FIG. 3, a vibrator or rotatable member 85 is preferably provided which preferably moves in a circle preferably to periodically contact the second header chain 57b and preferably to displace second header chain 57b generally upwardly from its at-rest position thereby to jostle second header chain 57b and cause dirt to be dislodged from second header chain 57b. The straight double-ended arrow 86 in FIG. 3 illustrates the direction of transverse movement of the second header chain 57b, perpendicular to the line along which the second header chain 57b moves, caused by the rotational motion applied in the direction of the curved arrow 87.

Referring to FIG. 3, the vibrator 85 used on the second header chain 57b is driven by a hydraulic motor (not shown) which is independently speed controlled. The motor rotates a long bar 89 that has wheels or pulleys 88 rotatably mounted on it, on opposite diametrical sides of bar 89. The wheels or pulleys 88 preferably contact a belt portion of the second header chain 57b as they rotate. It is alternately permissible for the wheels or pulleys 88 to contact the bar portions of the second header chain 57b. As the wheels or pulleys 88 rotate they impart some vibration to the header chain 57b which serves to knock dirt out of the vine mass 28 and more particularly out of the header chain 57. The vibration motor is preferably driven at about 60 to about 300 rpm but the speed can go as high as 1,000 rpm as desired, depending on conditions. It is to be understood that bar 89 rotates about its own axis and that pulleys 88 are mounted for rotation about their individual axes, which are parallel to the axis of bar 89 and that pulleys 88 and their mounting apparatus, which is not illustrated in FIG. 3, rotate unitarily with bar 89 to provide the jostling of second header chains 57b in a direction transverse thereto, thereby working to dislodge dirt clogs which may be lodged in the chain between the various bars or links of the chain.

Referring to FIG. 9, a feed reel 91 is provided which is rotatably connected to longitudinal support member 65 and located proximate to and generally above the vine mass cutting bar 51 with the axis 92 of the reel 91 being transverse to the direction of travel of the apparatus 30 in the field. The reel 91 rotates in a direction such that at closest approach of reel 91 periphery and cutting bar 51, the reel 91 periphery and the ground move in a common direction relative to the cutting bar 51 as the apparatus 30 travels through the field.

The reel 91 includes generally tangentially positioned, transversely extending members 93 for urging the vine mass 28 towards a pickup position of the first header chain 57a beneath the reel 91. Preferably, the members 93 are resilient in a direction normal to the direction of tangency. In one particular embodiment, the transversely extending members 93 comprise rough surface belting. Desirably, the rougher surface of the belting is exposed as the exterior surface and the belting is manufactured from a resilient material providing a degree of resiliency as it urges, smooths, folds, or pinches, in somewhat of a sweeping type of action, the vine mass 28 against the first header chain 57a in order for the vine mass to be fed into sheet metal housing 102 within which the vibratory means are located for separation of the fruits or vegetables from the vine mass. Each piece of belting is desirably about four inches in length; each one is mounted tangentially to the reel 91. Desirably there are about twenty (20) pieces of such rough surface belting mounted on an inner roller 95 thereby to define feed reel 91.

As illustrated in FIG. 9, the reel 91 is vertically adjustable using chain 94 and bolt 96 so as to facilitate the harvesting of different species and varieties of vinous crops by apparatus 30. For most applications, feed reel 91 is positioned so that there is about 1 inch (2.54 cm) of clearance between the tip of the rough surface belting extremities and second header chain 57b.

The inner roller 95 on which the feed reel 91 is built is desirably about ten inches (25.4 cm) in diameter. Further, the bases of the rough surface belting and the way the reel 91 and belting are mounted desirably result in about a 13 inch (33.02 cm) effective outer diameter for feed reel 91.

It is within the purview of the invention to provide a spring loaded reel 91 in order to adjust the weight or the force, specifically the pinching force, that is applied to the vine mass 28.

It is further within the purview of the invention to position feed reel 91 right against the first header chain 57a with a light bias or weight force so that even a single fruit 29 does not get mashed if the fruit 29 is caught between the feed reel 91 and the first header chain 57a, since the feed reel 91 is preferably essentially contacting or closely spaced from the first header chain 57a.

The feed reel 91 is driven by a hydraulic motor (not shown) having a speed control. The feed reel 91 is preferably independently controlled and is preferably coordinated with the speed of the header conveyor 56. If the feed reel 91 is going too fast, much faster than the header conveyor 56, vine mass 28 will tend to wrap around feed reel 91. It is further within the purview of the invention to provide a sensor and microprocessor to sense the ground speed of the apparatus 30 and to coordinate the speed of the feed reel 91 and the speed of the first header chain 57a to match the speed of the apparatus 30 over the ground.

In FIG. 7, one embodiment of the vibrating means 60 in accordance with the present invention is shown. The vibrating means 60 preferably comprises a first shaker 61a and a second shaker 61b, both for imparting vibratory motion to the vine mass 28 to separate fruit 29 from the vine mass 28. Vine mass 28 is not illustrated in FIG. 7 to enhance the clarity of the drawing. The first shaker 61a receives the vine mass 28 from the header conveyor 56 as shown in FIG. 7. The first shaker 61a includes tines 62 extending from the shaker 61 for engaging the vine mass 28 and vibratingly carrying the vine mass 28 along arcuate paths as the shaker 60 rotates.

A vibration motor (not shown) is used to run the shaker 61a. (As used here in the term "vibration motor" denotes the shaker motor drive and vibration apparatus disclosed generally in U.S. Pat. No. 5,099,636, the disclosure of which is hereby incorporated herein by reference.) The vibration motor is preferably driven at about 300 rpm but the speed can go as high as 1,000 rpm as desired, depending on conditions. Note that the speeds given are the speeds for the vibration motor prior to speed reduction by a gear box associated with the motor and shaker assembly. It is to be understood that the shaker rotational speed, specifically the speed of the tips of the shaker tines, is desirably that of the ground speed of the apparatus, as indicated above.

It is within the perview of the invention to provide microprocessor means to coordinate operation of the vibration motors, the various hydraulic motors and the cutting bar vibration with the ground speed of the apparatus and further to coordinate and the adjust the same according to the particular crop being harvested and the conditions of the harvest.

On the shaker 61a, the tines 62a are preferably spaced at about 3.5 inches (8.89 cm) apart in the axial direction along a hub 63a. The shaker 61a itself is preferably about 91 inches (2.31 m) wide. The length of the tines 62a is preferably the same as described in prior U.S. Pat. No. 5,099,636; however, length of tines 62a may be varied according to the vine mass crop being harvested, the particular density of the crop that particular year and the like.

The tines 62a are preferably covered with a polyurethane of 90 durometer, which is a poured polyurethane material. The tines 62a also could be injection molded. In any event, the tines 62a are preferably blunt so that the tines 62 are not going to penetrate or damage the fruit 29. Further, the tines 62a are preferably canted forward in the same manner as shown in U.S. Pat. No. 5,099,636. In addition, the covering on the hub 93 is preferably 0.1875 inch (0.476 cm) plastic UMHW ultra-high molecular weight plastic.

As also shown in FIG. 7, the vibrating means 60 further includes a vine mass conveyor 70 for transporting the vine mass 28 upon disengagement from the first shaker 61a to a position of engagement with a second shaker 61b, which is essentially identical to the first shaker 61a. Within the vine mass conveyor 70 is a fruit conveyor 74 which catches and conveys fruits 29 separated from the vine mass 28 to a fruit discharge position which, in FIG. 7, is constituted by a separator 80.

Both the vine mass conveyor 70 and the fruit conveyor 74 preferably include a plurality of transversely extending longitudinally separated bars 76 with longitudinally extending endless ribbon-like means 77 for flexibly connecting transverse extremities of the bars 76. The ribbon-like means 77 includes a plurality of evenly spaced lugs 78 on inwardly facing portions 79 of the ribbon-like flexible connecting means 77. In a preferred embodiment, as shown in FIG. 8, the lugs 78 of the vine mass conveyor 70 and the fruit conveyor 74 inter-engage each other as the two conveyors, 70 and 74, are preferably commonly driven by gear 73. Desirably the vine mass conveyor links are widely spaced apart so as to permit fruit to fall therethrough while fruit conveyor 74 has links that are narrowly spaced one from another so that fruit caught on fruit conveyor 74 is conveyed to a desired locale.

Figure 15:
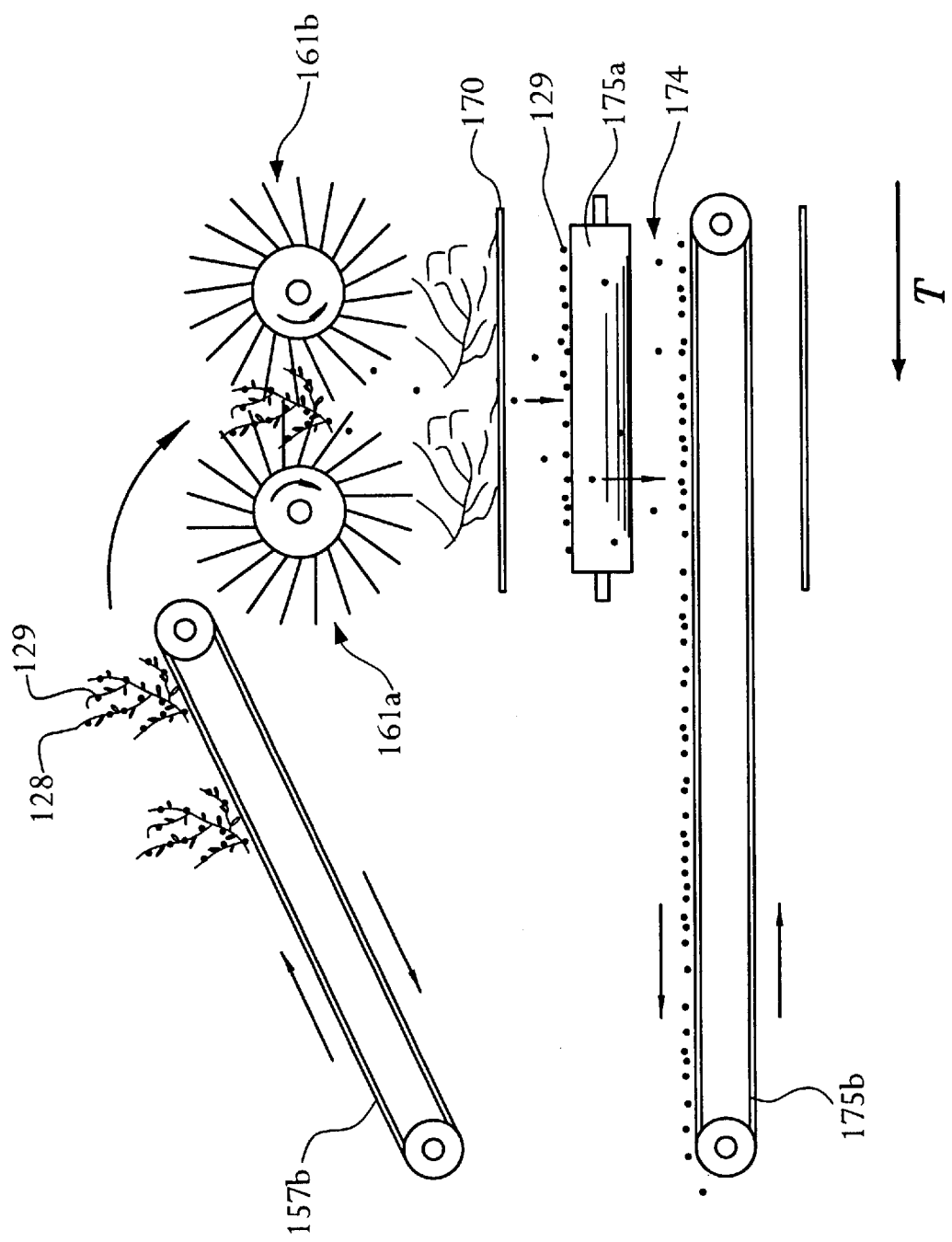
FIG. 15 is a schematic side elevation view of an alternative embodiment of vibrating means, manifesting aspects of the invention, usable in place of the vibrating means illustrated partially in FIG. 13 and in more detail in FIGS. 1, 6 and 12, manifesting aspects of the invention.

An alternate configuration of the vibrating means 160 is shown in FIG. 15. The fruit conveyor 174 includes a first conveyor 175a for conveying fruit 129 in a direction substantially transverse to the direction of travel of apparatus 130 and a second conveyor 175b for conveying fruit 129 in a direction generally parallel with the direction of travel of apparatus 130. The direction of travel of apparatus 130 is indicated in FIG. 15 by arrow T. It is to be understood in FIG. 15 that the elements shown of the vibration means are displaced from one another in a direction transverse to the plane of the paper in the fruit harvesting apparatus. Specifically in the apparatus as illustrated in FIGS. 1, 6 and 12, second conveyor 175b would be offset from the position of inclined conveyor 157b.

It is to be noted in FIG. 15 that the travel of the fruit carrying vine mass is initially upwardly with respect to the ramp or inclined conveyor 157b. The vine carrying fruit mass is then delivered to a position at which vibration is initially applied to the fruit carrying vine mass by shaker assemblies 161a and 161b as the vine mass travels downwardly and is vibrated by the two shakers with their preferably interleaved tines. Hence the vine mass initially travels along an upwardly inclined linear path and then along an arcuate path from the ramp conveyor 157b into the position of interdigitation between the two shakers 161a and 161b.

At that position, where the fruit is removed, the vine mass then drops onto a vine mass carrying conveyor 170 for removal thereby from the apparatus while the fruit preferably falls through vine mass conveyor 170 onto a first fruit conveyor 175a. The fruit 129 is carried by first fruit conveyor 175a in a direction preferably transverse to the direction of travel of the harvesting apparatus to the growing field for delivery on to a second fruit carrying conveyor 175b which in turn carries the fruit to a collection station, with fruit carriage being in a direction parallel with the direction of travel of the harvesting apparatus through the growing field as indicated by arrow T.

Figure 16:
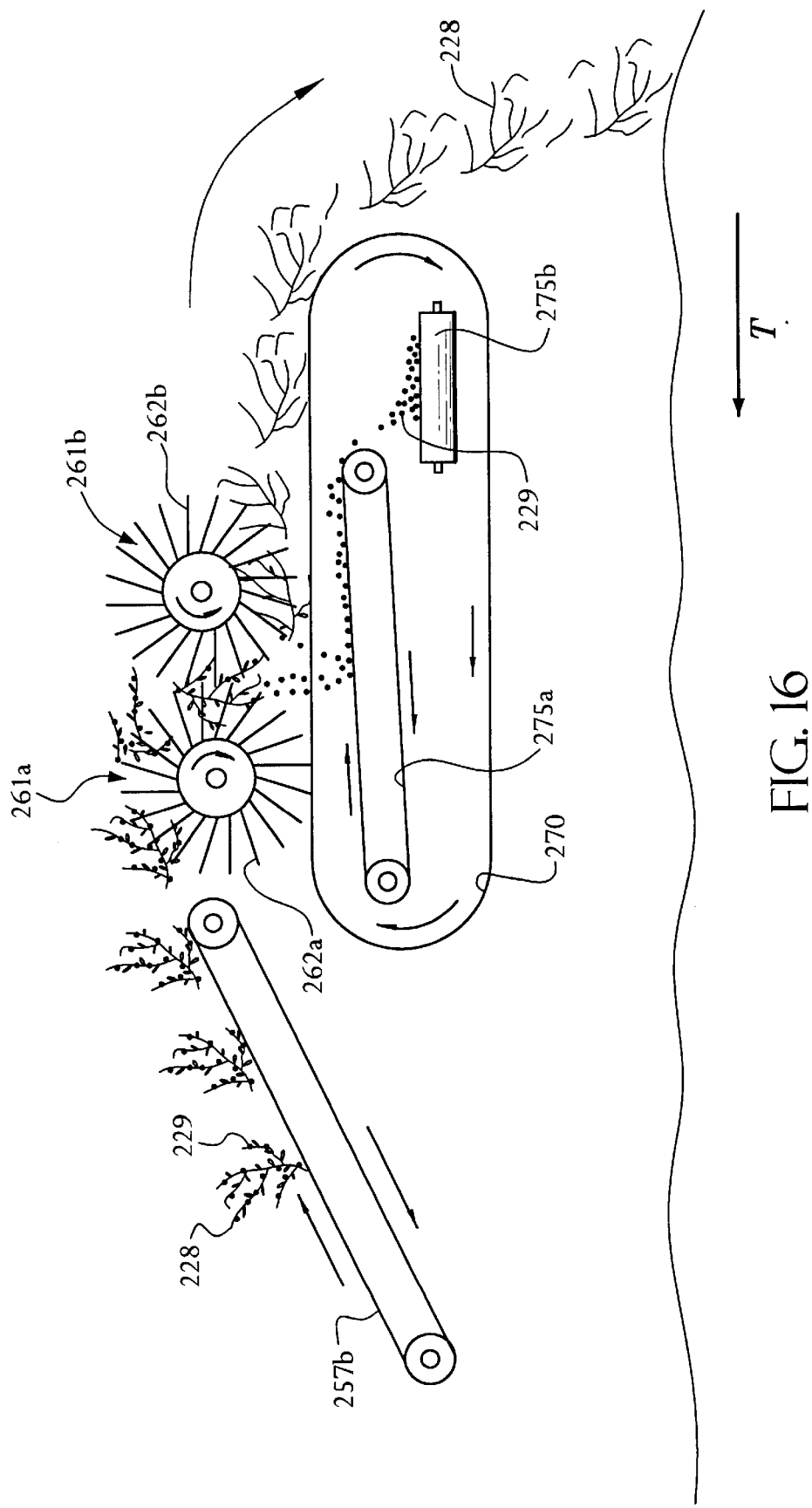
FIG. 16 is a schematic side elevation view of an alternative embodiment of yet another vibrating means, manifesting aspects of the invention, usable in place of the vibrating means illustrated partially in FIG. 13 and in more detail in FIGS. 1, 6 and 12, manifesting aspects of the invention.

FIG. 16 illustrates another configuration of vibrating means 260 for receiving the vine mass 228 from an upwardly inclined conveyor 256 for imparting vibratory motion to the vine mass 228 to separate fruit 229 from the vine mass 228 and further including a vine mass conveyor 270 for transporting the vine mass 228 upon disengagement from the first shaker means 261a to a vine mass discharge position and yet still further including a fruit conveyor 274 which, as illustrated, is desirably at least partially within and at least partially below the vine mass conveyor 270. The fruit conveyor 274 includes a first conveyor 275a for transporting fruit 229 generally in a direction parallel with the direction of travel of the apparatus 230 through the growing field and a second conveyor 275b for transporting fruit 229 in a direction transverse to the direction of travel through the growing field. The direction of travel is indicated in FIG. 16 by arrow T. In FIG. 16 the respective tines 262a, 262b extending from the unnumbered shaker hubs of shakers 261a, 261b are positioned to interleave one with another as the shaker hubs rotate in the direction shown by the unlettered arrows. It is preferable that such interleaving be effectuated and the tines not contact one another, as illustrated in FIG. 16.

In the configuration of apparatus illustrated in FIG. 16 the fruit carrying vine mass is initially transported upwardly along an inclined linear path by vine mass carriage conveyor 257b to a position where the vine mass is initially engaged by the tines of shaker assembly 261a so as to carry the fruit carrying vine mass along an arcuate path in to position where the tines of shaker 261a interleave with the tines of shaker 261b. At this position the vine mass is doubly vibrated by the influence of vibratory motion applied by both shakers 261a, 261b as the vine mass falls downwardly therebetween. Fruit separated by the shaking action falls through a vine mass conveyor 270 onto a fruit conveyor 275a and is preferably conveyed thereby in a direction opposite to the direction of travel of the harvesting machine through the growing field to a position of discharge therefrom onto a second fruit carrying conveyor 275b which transports the fruit in a direction transverse to the direction of travel through the growing field. The vine mass, having had the growing fruit removed therefrom, is carried by vine mass conveyor 270 in a direction generally opposite to the direction of travel of the harvesting apparatus through the growing field to a discharge position whereupon the vine mass is discharged on the ground. The vine mass conveyor conveys the vine mass initially along a linear substantially horizontal path to a discharge position as indicated by the curved unnumbered arrow in FIG. 16.

Figure 17:
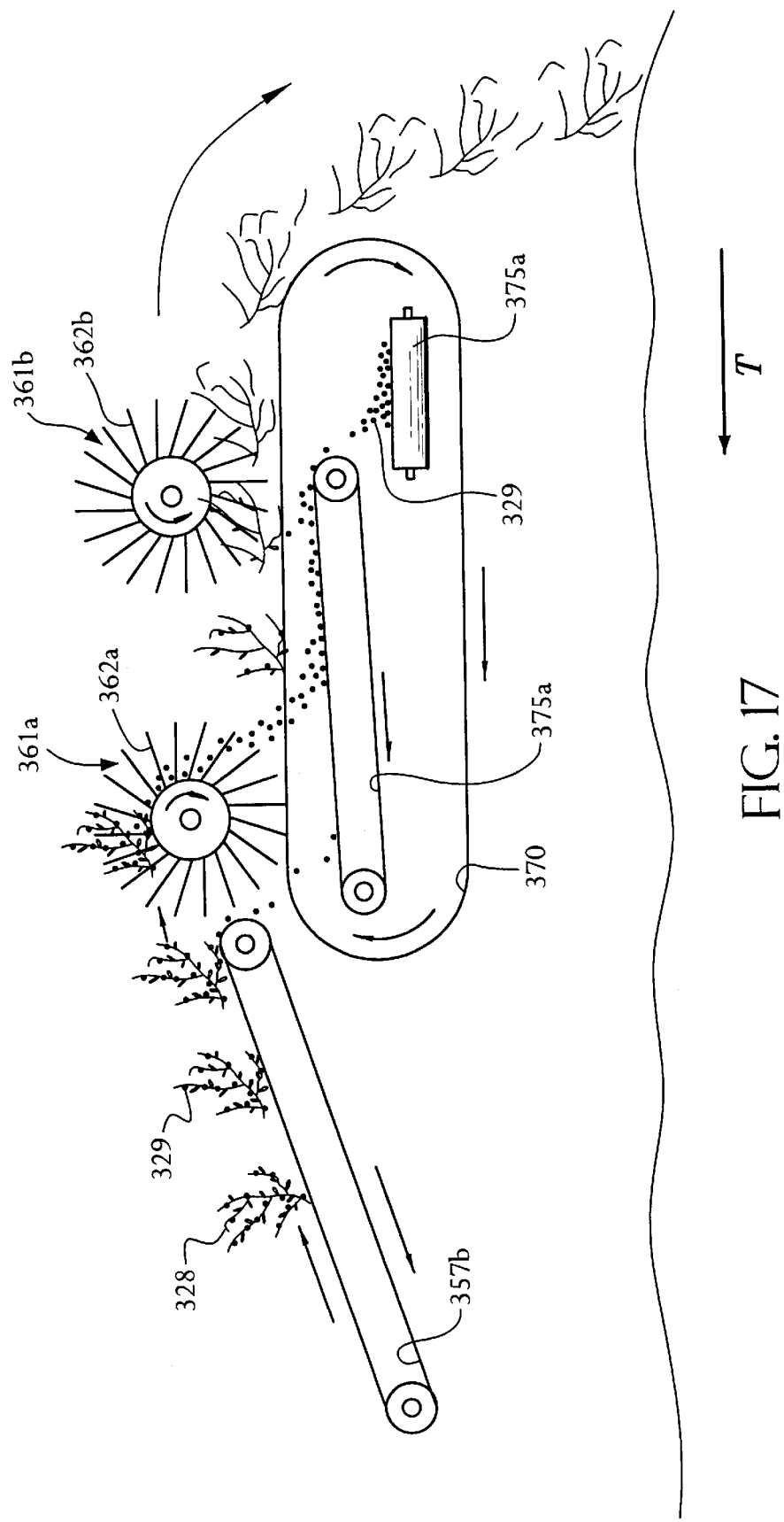
FIG. 17 is a schematic side elevation view of an alternative embodiment of still yet another vibrating means, manifesting aspects of the invention, usable in place of the vibrating means illustrated partially in FIG. 13 and in more detail in FIGS. 1, 6 and 12, manifesting aspects of the invention.

Yet another configuration of vibrating means 360 for receiving the vine mass 328 from an upwardly inclined conveyor 356 for imparting vibratory motion to the vine mass 328 to separate fruit 329 from the vine mass 328 is illustrated in FIG. 17. The configuration of FIG. 17 differs from that of FIG. 16 in the relative positions of the shakers. In the embodiment of FIG. 16, shakers 261a and 261b are positioned such that the tines 262a and 262b may interleave with each other at the point of closest approach. In the embodiment of FIG. 17, however, the distance between the shakers 361a and 361b is substantially larger than the distance between shakers 261a and 261b.

In the apparatus schematically illustrated in FIG. 17, the fruit carrying vine mass is initially carried upwardly along an inclined linear path by a vine mass conveyor 357b into a position for engagement with the tines of a shaker 361a. This shaker carries the fruit carrying vine mass conveyor 357b into a position for engagement with the tines of a shaker 361a. This shaker carries the fruit carrying vine mass along an arcuate path and applies vibration thereto until the vine mass reaches a position at which it can fall free of the tines of shaker 361a. At this position the vine mass falls downwardly and is substantially devoid of fruit, with the fruit having been removed by the vibration applied by first shaker 361a.

The vine mass is thereafter carried preferably horizontally by vine mass conveyor 370a into engagement with a second shaker 361b whereupon additional vibration is applied to the vine mass thereby remove any fruit and entrained within the vine mass. The vine mass continues to travel horizontally as it is carried by vine mass conveyor 370 and is vibrated by engagement with the tines of second shaker 361b to a discharge position whereupon the vine mass is discharged from the harvesting apparatus in a downward direction that is generally illustrated in FIG. 17.

The harvested fruit falling from the vine mass either by action of the first vibratory shaker 361a or the second vibratory shaker 361b falls on to a preferably upwardly inclined fruit conveyor 375a which carries the fruit generally in a direction opposite to the direction of travel of the harvesting machine through the field to a discharge position, whereupon the fruit falls from first fruit carrying conveyor 375a on to second fruit carrying conveyor 375b which carries the fruit preferably in a direction transverse to the direction of travel of the harvesting machine through the growing field to a collection station. Of course, if size separation or color separation equipment is used as a part of the harvesting apparatus, which is within the purview of the invention, the fruit is delivered by second conveyor 375b or by any of the other fruit conveyors illustrated in the other drawing figures, to such equipment.

Figure 18:
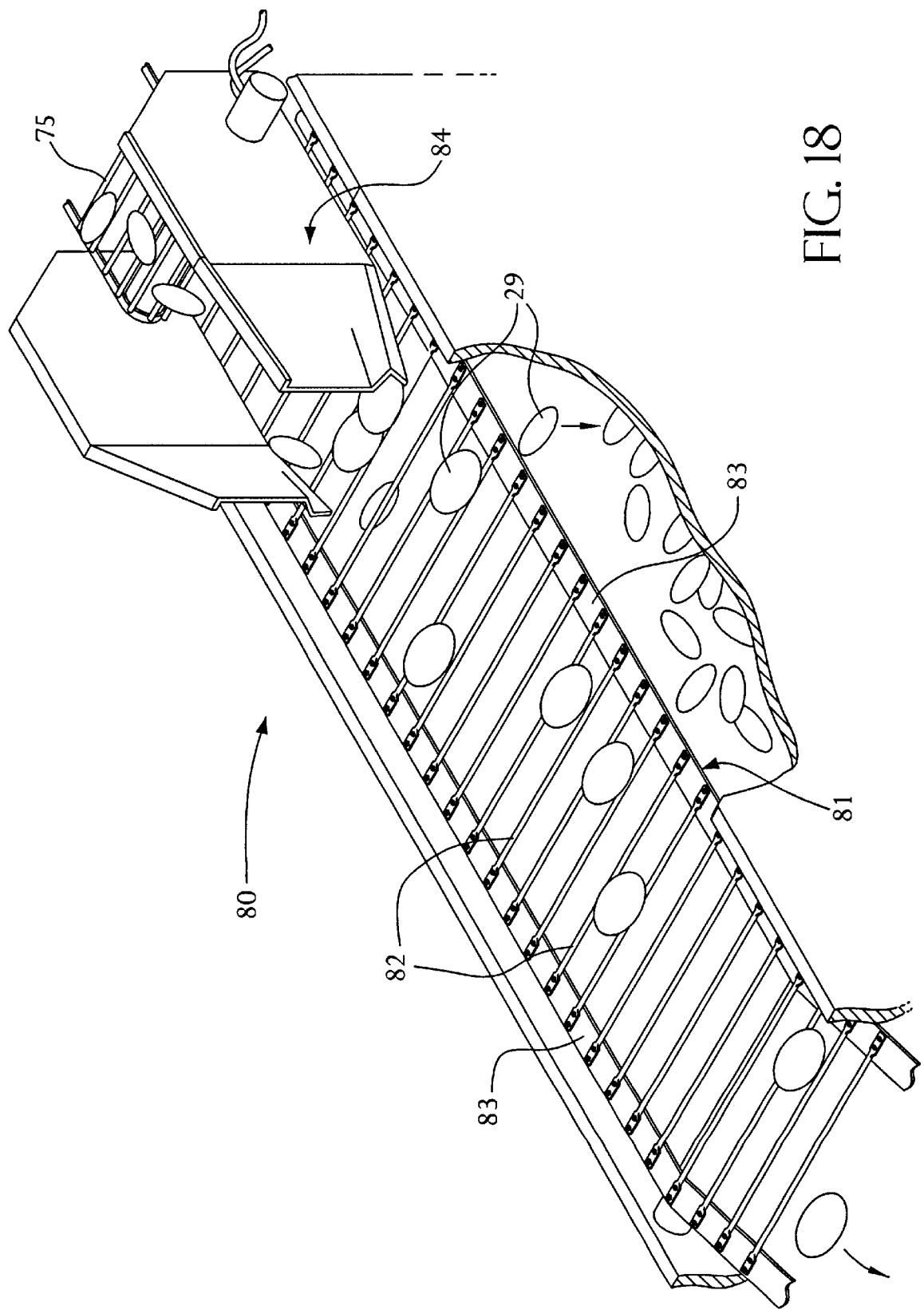
FIG. 18 is a partially broken, isometric view of a mechanical device for separating harvested fruits or vegetables according to size, manifesting aspects of the invention, which may be used with any of the harvesting apparatus/vibratory means combinations illustrated in FIGS. 1 through 17.

A separator 80, specifically adapted for separating cucumbers or other cucumber-like fruits by size, forming a part of apparatus 30, is somewhat visible in FIGS. 6 and 12 and is shown in FIG. 18. Separator 80 comprises an endless conveyor 81. Forming a portion of the endless conveyor 81 are a plurality of transversely extending bars 82 longitudinally separated from one another at spacings equal to the predetermined maximum or minimum desired thickness of the fruits 29. Longitudinally extending endless ribbon-like means 83 flexibly connect transverse extremities of the bars 82. The ribbon like means 83 are preferably resilient material, most preferably rubber. Other materials such as suitable plastics may also be used. Bars 82 are preferably steel and are desirably covered with rubber or cushioning material to avoid bruising and damage to the fruit. The separator 80 further includes means 84 for depositing the fruits 29 on the bars 82 and orienting the fruits 29 with their longitudinal axes parallel with the bars 82.

In operation, when the apparatus 30 is first maneuvered into the field, the operator configures the apparatus 30 as shown in FIG. 6. In addition, the apparatus 30 is configured to be as narrow as possible so as to avoid damaging the crop. Accordingly, the left hand wheels 41a are underneath the header conveyor 56 and, consequently, go over ground from which the crop has already been picked. However, the right hand wheels 41b may damage the existing crop. Accordingly, the operator preferably keeps the right hand wheels 41b retracted, at least at the beginning of the picking operation, and extends them later on. Desirably, the axle 37 is extended while the apparatus 30 is moving forward so that excessive stress is not applied to the wheels 41. To start harvesting, the apparatus 30 is arranged with the vine row cutting means 47, the cutting means 50, and the header conveyor 60 in position for harvesting, as shown in FIG. 12. When the operator gets to the end of the row, he actuates the main cylinder 31 to lift off of the ground (in order to make his turn) the cutting bar, take up reel and associated structure.

The apparatus illustrated in FIGS. 1, 6 and 12 is particularly adapted for harvesting of cucumbers, or "pickles" as small cucumbers are known in the trade. Of course, the apparatus may also be used for harvesting tomatoes and other crops in which case it may or may not be necessary to use the reel 91. When tomatoes are being harvested, level control of the apparatus may be critical in order that any automatic color sorting equipment which may incorporated on to the machine operates successfully. When cucumbers are being harvested, level control may not be so critical since cucumber sizing is conventionally done mechanically using apparatus as illustrated in FIG. 18 or some substantial equivalent.

Another embodiment of an apparatus 130 for detaching and collecting fruits 129 from a vine mass 128 during travel through a growing field is shown in FIG. 13. The apparatus 130 is particularly suitably adapted for harvesting crops such as peppers, which grow in rows. The apparatus 130 differs specifically from the apparatus 30 illustrated in FIGS. 1, 6 and 12 in providing a picker head 198. The picker head 198 is particularly well-suited for harvesting crops, such as peppers, which are grown in rows, as opposed to crops where a vinous mass indiscriminately covers the surface of the growing field. When apparatus 130 incorporates a picker head 198, use of a reel 91 will usually not be required, however, under some conditions a reel may be combined with a picker head 198.

Picker head 198 is illustrated in greater detail in FIG. 14 and desirably includes means for drawing the crop along the angular surfaces 199 defining the noses of picker head 198 in to the vertices 201 at which suitable cutting apparatus are preferably provided. Alternatively, a picker head such as illustrated as 198 may be used as a passive picker head, without using any means to guide growing plants along angular surfaces 199 and with cutting at vertices 201 provided by a cutting bar such as cutting bar 51 illustrated in FIGS. 1 and 6, positioned substantially below vertices 201 of picker head 198.

In any of the embodiments illustrated and discussed herein, in terms of the speed of oscillation of the cutting bar 51, a hydraulic motor (not shown) preferably drives it at a motor speed of between 200 and 300 revolutions per minute. Due to the eccentricity associated with a drive bar (not shown) which connects the hydraulic drive motor to the cutting bar, this results in a corresponding cycle or frequency of oscillation of the cutting bar 51 of 200–300 oscillations per minute.

Under certain conditions, such as when harvesting in wet conditions, it may be necessary to increase the speed of cutting bar oscillation. However, vibrational speed cannot be too high or the cutting bar might possibly vibrate the fruit 29 loose from the vine mass 28, which would be undesirable. The motor is preferably a hydraulic motor and with the speed control is mounted on longitudinal support member 65 above the header conveyor 56 just behind and above feed reel 91.

The present invention further encompasses methods for harvesting vinous crops, such as tomatoes and cucumbers, which comprises the steps of cutting a vine mass 28 from its growing roots, moving the vine mass along the various linear and arcuate paths described herein, imparting vibratory motion to the vine mass 28 to separate or break fruit 29 from the vines of the vine mass 28 and thereafter conveying the separated fruit and the vine mass along the various linear and arcuate paths as described herein. The methods further encompass separating the fruit 29 according to size.

The apparatus may also be self-propelled; the invention is not limited to tractor-pulled or powered apparatus.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. Apparatus for harvesting fruit from vinous crops comprising:
   a. cutting means for cutting a fruit-carrying vine mass of said crop from its growing roots;
   b. first vibrating means, receiving said vine mass from said cutting means, for imparting first vibratory motion to said vine mass to separate fruit from vines of said vine mass, comprising:
      i. a first rotatable shaker;
      ii. means for drivingly rotating said first shaker and imparting vibratory motion thereto during rotation thereof;
      iii. means, extending from said first shaker, for engaging said vine mass and vibratingly carrying said vine mass along an arcuate path over said first shaker as said first shaker vibratingly rotates;
   c. means receiving said vine mass upon disengagement from said first vibrating means, for transporting said vine mass away from said first vibrating means while permitting fruit separated from said vines to fall therethrough;
   d. second vibrating means engaging said vine mass, for imparting second vibratory motion to said vine mass to separate from said vine mass detached fruits remaining entrapped therein after application of said first vibratory motion to said vine mass;
   e. a reel located proximate to and generally above said cutting means, the axis of said reel being transverse to direction of travel of said apparatus through said field, said reel rotating in a direction such that at closest approach of said reel periphery and said cutting means, said reel periphery and said ground move in a common direction relative to said cutting means as said apparatus travels through said growing field for urging said plants towards a pick-up position portion of an upwardly inclined conveyor beneath said reel; and
   f. said upwardly inclined endless conveyor transporting plants upwardly from the ground after being cut from their roots by said cutting means and being urged thereagainst by said reel to a position at which said fruits are detached from said vinous plants.

2. Apparatus of claim 1 wherein said second vibrating means further comprises:
   a. a second rotatable shaker;
   b. means for drivingly rotating said second shaker and imparting vibratory motion thereto during rotation thereof; and
   c. means extending from said second shaker for vibrating said vine mass during conveyance thereof.

3. A method for harvesting vinous crops comprising:
   a. cutting a fruit-carrying vine mass from its growing roots;
   b. sweeping said cut vine mass with rotary reel means onto an upwardly inclined endless conveyor for carriage thereby to a position of commencement of a first arcuate path;
   c. carrying said vine mass along said first arcuate path by first lifting said vine mass and then lowering said vine mass while imparting vibratory motion to said vine mass to separate fruit from vines of said mass;
   d. catching fruit separated from said vines and conveying said fruits to a discharge position;
   e. conveying the vine mass remaining along a linear path while imparting second vibratory motion thereto;
   f. catching falling fruit, separated from said remaining vine mass by application of said second vibratory motion thereto and conveying said caught fruits to said discharge position.

4. The method of claim 3 wherein said vibratory motion is imparted to said remaining vine mass by engaging said remaining vine mass with tines extending radially from a rotatable shaker while said remaining vine mass is being linearly conveyed.

5. The method of claim 4 wherein the linear speed of said tine tips matches the speed at which said remaining vine mass is being conveyed.

6. Harvesting apparatus for detaching and collecting fruits from vinous plants during travel through a growing field, comprising:
   a. a longitudinally elongated frame adapted to be pulled by a tractor;
   b. an adjustable length axle connected to said frame and being generally transverse thereto, comprising:
      i. a tubular member; and
      ii. a shaft within said tube and being extendible out of said tubular member in one transverse direction only respecting said frame;
   c. wheels rotatably mounted on respective ends of said axle for supporting said apparatus during travel thereof through said growing field;
   d. a body assembly support housing pivotally mounted on said frame;
   e. means for adjustably positioning said body assembly support housing relative to said frame, to maintain said body assembly support housing substantially level when said harvesting apparatus traverses an incline in said growing field;
   f. means for cutting said plants from their roots, extending transversely to direction of apparatus travel through said growing field and being generally flat to define a plane;
   g. means for adjustably positioning said cutting means plane at a selected angle to the ground;
   h. an upwardly inclined endless conveyor transporting vinous plants upwardly from the ground after being cut from their roots by said cutting means and being urged thereagainst by said reel to a position at which said fruits are detached from said vinous plants;
   i. first means, receiving said vine mass from said upwardly inclined conveyor, for imparting first vibratory motion to said vine mass to separate fruit from vines of said vine mass;
   j. a vine mass conveyor, below said first means for imparting vibratory motion to said vine mass, for transporting said vine mass upon disengagement from said first shaker to a vine mass discharge position;
   k. a fruit conveyor, below said means for imparting vibratory motion to said vine mass, at least partially within and below said vine mass conveyor and in contacting driving engagement therewith for catching and conveying fruit separated from said vines to a fruit discharge position; and
   l. means, engaging said vine mass during movement thereof by said vine mass conveyor, for imparting second vibratory motion to said vine mass during transport thereof, to release trapped fruit from within said vine mass.

7. A method for separating fruit from vinous crops comprising:

a. carrying a vine mass along a first arcuate path by first lifting said vine mass and then lowering said vine mass while imparting vibratory motion to said vine mass to separate fruit from said vine mass;

b. transporting said vine mass away from said first arcuate path as fruit separated from said vine mass falls therethrough;

c. catching said separated fruit falling through said vine mass and transporting said fruit separately from said vine mass towards a collection station;

d. carrying said vine mass along a second arcuate path while imparting second vibratory motion thereto to separate additional fruit from said vine mass;

e. catching said additional fruit falling from said vine mass with said fruit transport means and transporting said additional fruit together with said firstly separated fruit towards said collection station.

8. Apparatus for separating fruit from vinous crops comprising:

a. first vibrating means for imparting first vibratory motion to separate fruit from a vine mass, comprising:
 i. a first rotatable shaker;
 ii. means, extending from said first shaker, for engaging said vine mass and vibratingly carrying said vine mass along an arcuate path over said first shaker as said first shaker vibratingly rotates;

b. means receiving said vine mass and said fruit, for transporting said vine mass away from said first vibrating means while permitting said fruit to fall therethrough;

c. means catching said fruit falling therethrough, for transporting to a collection position;

d. second vibrating means for imparting second vibratory motion to separate additional fruit from said vine mass, comprising:
 i. a second rotatable shaker;
 ii. means, extending from said second shaker, for engaging said vine mass and vibratingly carrying said vine mass along an arcuate path while said second shaker vibratingly rotates;

e. means catching said additional fruit, for transporting said additional fruit together with said firstly separated fruit to said collection position.

9. A method for harvesting cucumbers without application of compressive force thereto, comprising:

a. cutting cucumber-bearing vines from their growing roots;

b. sweeping said vines by application of tangential rotary motion thereto onto an endless conveyor for carriage thereby to a position defining commencement of a first arcuate path;

c. carrying said vines along said first arcuate path by first lifting and then lowering said vines while imparting vibratory motion to said vines to separate cucumbers from said vines;

c. catching separated cucumbers falling from said vines and conveying said separated fallen cucumbers to a discharge position;

d. conveying said vines along a linear path while imparting second vibratory motion thereto to release separated cucumbers trapped in said vines;

e. catching falling cucumbers released from said vines by application of said second vibratory motion thereto and conveying said caught freed cucumbers to said discharge position.

10. The method of claim 9 wherein said second vibratory motion is imparted to said vines by engaging said vines with tines extending radially from a rotatable shaker while said vines are being linearly conveyed.

11. The method of claim 10 wherein linear speed of said tine tips means matches speed of conveyance of said vines.

12. The method of claim 11 wherein said cutting is performed vibratingly.

13. The method of claim 10 further comprising:

a. conveying said vines from where they are cut from their growing roots upwardly to said first arcuate path; and b. urging said vines on to an upwardly inclined conveyor for conveyance thereof by brushing said vines as they are cut from their roots towards said conveyor with resilient flaps extending tangentially from a rotating reel.

14. The method of claim 13 wherein said cutting is performed vibratingly.

15. Harvesting apparatus for detaching and collecting fruits from vinous plants during travel through a growing field, comprising:

a. a longitudinally elongated frame adapted to be pulled by a tractor;

b. an adjustable length axle connected to said frame and being generally transverse thereto, comprising:
 i. a tubular member; and
 ii. a shaft within said tube and being extendible out of said tubular member in one transverse direction only respecting said frame;

c. wheels rotatably mounted on respective ends of said axle for supporting said apparatus during travel thereof through said growing field;

d. a body assembly support housing pivotally mounted on said frame;

e. means for adjustably positioning said body assembly support housing relative to said frame, to maintain said body assembly support housing substantially level when said harvesting apparatus traverses an incline in said growing field;

f. a bar for cutting said vinous plants from their roots, extending transversely to direction of apparatus travel through said growing field, said bar being generally flat to define a plane;

g. means for adjustably positioning said bar with said plane defined by said bar at a selected angle to the ground;

h. means, mounted on said frame and connected to said bar positioning means, for oscillating said bar in said plane generally in the direction of apparatus travel through said growing field;

i. a reel rotatably connected to said frame, located proximate to and generally above said cutting bar, the axis of said reel being transverse to direction of travel of said apparatus through said field, said reel rotating in a direction such that at closest approach of said reel periphery and said cutting bar, said reel periphery and said ground move in a common direction relative to said cutting bar as said apparatus travels through said growing field;
 i. said reel including generally tangentially positioned transversely extending members for urging said vinous plants towards a pick-up position portion of an upwardly inclined conveyor beneath said reel, said members being resilient normal to said direction of tangency;

j. said upwardly inclined endless conveyor transporting vinous plants upwardly from the ground after being cut from their roots by said cutting bar and being urged thereagainst by said reel to a position at which said fruits are detached from said vinous plants, comprising:
   i. a plurality of transversely extending longitudinally separated bars;
   ii. longitudinally extending endless ribbon-like means for flexibly connecting transverse extremities of said bars;
k. means for removing earth entrained between said bars of said conveyor by vibrating said conveyor bars during travel towards the ground, comprising:
   i. a shaft rotatable about a transverse axis; and
   ii. at least one roller mounted on said shaft for rotation therewith, said roller being additionally rotatable about a transverse axis parallel with said shaft axis, to cyclically displace said conveyor bars generally vertically as said bars travel towards the ground;
l. first means, receiving said vine mass from said upwardly inclined conveyor, for imparting first vibratory motion to said vine mass to separate fruit from vines of said vine mass, comprising:
   i. a first rotatable shaker;
   ii. means for drivingly rotating said first shaker and imparting vibratory motion thereto during rotation thereof;
   iii. means extending from said first shaker for engaging said vine mass and vibratingly carrying said vine mass along a first arcuate path over said first shaker as said first shaker rotates;
m. a vine mass conveyor, below said first means for imparting vibratory motion to said vine mass, for transporting said vine mass upon disengagement from said first shaker to a vine mass discharge position, comprising:
   i. a plurality of transversely extending longitudinally separated bars;
   ii. longitudinally extending endless ribbon-like means for flexibly connecting transverse extremities of said bars, comprising:
      (1) a plurality of evenly spaced lugs on inwardly facing portions of said ribbon-like flexible connecting means;
n. a fruit conveyor, below said means for imparting vibratory motion to said vine mass, at least partially within and below said vine mass conveyor, for catching and conveying fruit separated from said vines to a fruit discharge position, comprising:
   i. a plurality of transversely extending longitudinally separated bars;
   ii. longitudinally extending endless ribbon-like means for flexibly connecting transverse extremities of said bars, comprising:
      (1) a plurality of evenly spaced lugs on outwardly facing portions of said ribbon-like flexible connecting means interlocking engaging with said lugs of said ribbon-like flexible connecting means of said vine mass conveyor along a portion of a travel loop defined by said endless vine mass conveyor, for driving advancement of said vine mass conveyor by said fruit conveyor;
o. means, engaging said vine mass during movement thereof by said vine mass conveyor, for imparting second vibratory motion to said vine mass during transport thereof, to release trapped fruit from within said vine mass, comprising:
   i. a second rotatable shaker;
   ii. means for drivingly rotating said second shaker and imparting vibratory motion thereto during rotation thereof;
   iii. means extending from said second shaker, engaging said vine mass as said vine mass is transported by said conveying means, for vibrating said vine mass during conveyance thereof;
p. means, receiving said fruits from said fruit conveyor, for sorting fruits exceeding a predetermined maximum thickness from the remaining fruits, comprising:
   i. an endless conveyor, comprising:
      (1) a plurality of transversely extending bars longitudinally separated one from another at a spacing equal to a maximum thickness of said fruits;
      (2) longitudinally extending endless ribbon-like means for flexibly connecting transverse extremities of said bars;
   ii. means for depositing said fruits on to said bars and orienting said fruits with longitudinal axes parallel with said bars.

16. Harvesting apparatus for detaching and collecting fruits from vinous plants during travel through a growing field, comprising:
   a. a means for cutting said vinous plants from their roots, extending transversely to direction of apparatus travel through said growing field and being generally flat to define a plane;
   b. an upwardly inclined endless conveyor transporting plants upwardly from the ground after being cut from their roots by said cutting means to a position at which said fruits are detached from said plants, comprising:
      i. a plurality of transversely extending longitudinally separated bars;
      ii. longitudinally extending endless ribbon-like means for flexibly connecting transverse extremities of said bars;
   c. means for removing earth entrained between said bars of said conveyor by vibrating said conveyor bars during travel towards the ground;
   d. first means, receiving said vine mass from said upwardly inclined conveyor, for imparting first vibratory motion to said vine mass to separate fruit from vines of said vine mass;
   e. a vine mass conveyor, below said first means for imparting vibratory motion to said vine mass, for transporting said vine mass upon disengagement from said first shaker to a vine mass discharge position;
   f. a fruit conveyor, below said means for imparting vibratory motion to said vine mass, at least partially within and below said vine mass conveyor, for catching and conveying fruit separated from said vines to a fruit discharge position;
   g. means, engaging said vine mass during movement thereof by said vine mass conveyor, for imparting second vibratory motion to said vine mass during transport thereof, to release trapped fruit from within said vine mass, including a second rotatable shaker; and
   h. means, receiving said fruits from said fruit conveyor, for sorting fruits exceeding a predetermined maximum thickness from the remaining fruits.

17. Apparatus of claim 16 wherein said entrained earth removal means comprising:
   a. a shaft rotatable about a transverse axis; and b. at least one roller mounted on said shaft for rotation therewith, said roller being additionally rotatable about a transverse axis parallel with said shaft axis, to cyclically displace said conveyor bars generally vertically as said bars travel towards the ground.

18. Harvesting apparatus for detaching and collecting fruits from vinous plants during travel through a growing field, comprising:

a. a longitudinally elongated frame adapted to be pulled by a tractor;

b. an adjustable length axle connected to said frame and being generally transverse thereto, comprising:
  i. a tubular member; and
  ii. a shaft within said tube and being extendible out of said tubular member in one transverse direction only respecting said frame;

c. wheels rotatably mounted on respective ends of said axle for supporting said apparatus during travel thereof through said growing field;

d. a body assembly support housing pivotally mounted on said frame;

e. means for adjustably positioning said body assembly support housing relative to said frame, to maintain said body assembly support housing substantially level when said harvesting apparatus traverses an incline in said growing field;

f. means for cutting said vinous plants from their roots, extending transversely to direction of apparatus travel through said growing field and being generally flat to define a plane;

g. means for adjustably positioning said cutting means with said plane defined by said cutting means at a selected angle to the ground; and h. means, mounted on said frame and connected to said bar positioning means, for oscillating said cutting means in said plane generally in the direction of apparatus travel through said growing field.

19. Harvesting apparatus for detaching and collecting fruits from vinous plants during travel through a growing field including an inclined conveyor for transporting vinous plants upwardly to a position at which said fruits are detached from said plants and collected, comprising:

a. a rotatable reel proximate a pick-up end of said conveyor, the axis of said reel being transverse to direction of conveyance of said plants and above said conveyor pick-up and said reel rotating in a direction such that at closest approach of said reel periphery and said conveyor, said reel and said conveyor move in a common direction;

b. said reel including generally transversely extending members for urging said vinous plants towards said conveyor beneath said reel, said members being resilient and tangentially positioned transversely to said direction of tangency.

20. Vinous crop harvesting apparatus of claim 19 wherein said conveyor is endless and further comprises:

a. a plurality of transversely extending longitudinally separated bars;

b. longitudinally extending linkage means flexibly connecting transverse extremities of said bars;

wherein said apparatus further comprises:

c. means for removing earth entrained between said bars of said conveyor by vibrating said conveyor bars during conveyor travel towards the ground, comprising:
  i. a shaft rotatable about a transverse axis; and
  ii. at least one roller mounted on said shaft for rotation about a transverse axis parallel with said shaft axis to cyclically displace said conveyor bars generally vertically while said bars are traveling towards the ground.

21. Vinous crop harvesting apparatus of claim 19 wherein said conveyor is endless and further comprising:

a. a plurality of transversely extending longitudinally separated bars; and b. longitudinally extending linkage means flexibly connecting transverse extremities of said bars.

22. Apparatus of claim 21 further comprising means for removing earth entrained between said bars of said conveyor by vibrating said conveyor bars during conveyor travel towards the ground.

23. Apparatus of claim 22 wherein said means for removing earth entrained between said bars of said conveyor by vibrating said conveyor bars during conveyor travel towards the ground comprises:

a. a shaft rotatable about a transverse axis; and b. at least one roller mounted on said shaft for rotation about a transverse axis parallel with said shaft axis to cyclically displace said conveyor bars generally vertically while said bars are traveling towards the ground.

* * * * *